US012399096B2

(12) United States Patent
Wenzel et al.

(10) Patent No.: US 12,399,096 B2
(45) Date of Patent: Aug. 26, 2025

(54) AUTOMATIC MEASURING MACHINE, MANUFACTURING FACILITY AND METHOD

(71) Applicant: DIMENSIONICS GMBH, Esslingen (DE)

(72) Inventors: Jan Wenzel, Esslingen (DE); Jörg Wenzel, Neukloster (DE)

(73) Assignee: DIMENSIONICS GMBH, Esslingen (DE)

( * ) Notice: Subject to any disclaimer, the term of this patent is extended or adjusted under 35 U.S.C. 154(b) by 706 days.

(21) Appl. No.: 17/769,537

(22) PCT Filed: Oct. 16, 2020

(86) PCT No.: PCT/EP2020/079260
§ 371 (c)(1),
(2) Date: Apr. 15, 2022

(87) PCT Pub. No.: WO2021/074410
PCT Pub. Date: Apr. 22, 2021

(65) Prior Publication Data
US 2023/0076189 A1 Mar. 9, 2023

(30) Foreign Application Priority Data

Oct. 16, 2019 (DE) .................... 10 2019 215 936.2

(51) Int. Cl.
*G01N 9/36* (2006.01)
*G01N 9/02* (2006.01)
*G01N 9/08* (2006.01)
(52) U.S. Cl.
CPC ...................................... *G01N 9/36* (2013.01)
(58) Field of Classification Search
CPC ...... G01N 9/36; G01N 9/08; G01N 2009/022; Y02P 10/25
See application file for complete search history.

(56) References Cited

U.S. PATENT DOCUMENTS

| 5,606,126 A | 2/1997 | Glenville |
| 6,443,007 B1 | 9/2002 | Schnyder et al. |

FOREIGN PATENT DOCUMENTS

| CA | 1019974 | 11/1977 |
| CN | 108861543 | 11/2018 |

(Continued)

OTHER PUBLICATIONS

Office Action issued in corresponding Chinese Patent Application No. 202080087245.6, Apr. 10, 2024, 20 pages with translation.

(Continued)

*Primary Examiner* — Laura Martin
*Assistant Examiner* — Anthony W Megna Fuentes
(74) *Attorney, Agent, or Firm* — HSML P.C.

(57) ABSTRACT

An automatic measuring machine for automated determination of a respective density of a plurality of solid-state test pieces that includes a measuring arrangement with a dry weighing device and a wet weighing device. The measuring machine further includes a test piece magazine for holding the plurality of solid-state test pieces, and a feeding unit for feeding the solid-state test pieces from the test piece magazine to the measuring arrangement. The automatic measuring machine sequentially feeds the solid-state test pieces to the measuring arrangement by means of the feeding unit, to weigh the solid-state test pieces using the dry weighing device and the wet weighing device in order to obtain respective weighing measurement values for each solid-state test piece, and to determine a respective density value for each solid-state test piece on the basis of the respective weighing measurement values.

20 Claims, 17 Drawing Sheets

(56) References Cited

FOREIGN PATENT DOCUMENTS

| CN | 109883881 | | 6/2019 | | |
|---|---|---|---|---|---|
| DE | 24 55 389 C3 | | 6/1975 | | |
| DE | 694 18 507 T2 | | 1/2000 | | |
| DE | 10 2015 007 648 | | 12/2016 | | |
| EP | 0 612 995 | | 8/1994 | | |
| JP | 7-055681 | | 3/1995 | | |
| JP | 2012-068057 | | 4/2012 | | |
| KR | 20070096525 A | * | 10/2007 | ............. | G01N 9/08 |
| WO | 00/55596 | | 9/2000 | | |

OTHER PUBLICATIONS

Notice of Reasons for Refusal issued in corresponding Japanese Patent Application No. 2022-523092, May 16, 2024, 8 pages w/translation.

International Search Report issued in International Application No. PCT/EP2020/079260, Feb. 18, 2021, 5 pages w/translation.

Written Opinion issued in International Application No. PCT/EP2020/079260, Feb. 18, 2021, 7 pages.

Search Report in corresponding German application dated Jun. 30, 2020, 5 pages.

Second Office Action issued in corresponding Chinese Patent Application No. 202080087245.6, Feb. 13, 2025, 25 pages w/translation.

* cited by examiner

AUTOMATIC MEASURING MACHINE, MANUFACTURING FACILITY AND METHOD

BACKGROUND OF THE INVENTION

The invention relates to an automatic measuring machine for determining the density of solid-state test pieces. The automatic measuring machine serves in particular for use in an industrial environment, for example in a manufacturing hall, in which industrial manufacturing of solid-state test pieces expediently takes place. The solid-state test pieces are, for example, workpieces, in particular workpieces that are manufactured by means of additive manufacturing, in particular 3D printing. The term "solid-state test piece" is intended to express in particular that the test piece is not liquid. Furthermore, the solid-state test pieces may be workpieces manufactured by means of sintering, casting, injection molding or another process.

SUMMARY OF THE INVENTION

It is an object of the invention to provide an automatic measuring machine that enables efficient determination of the density of a plurality of solid-state test pieces.

The object is solved by an automatic measuring machine according to claim 1. The automatic measuring machine serves for the automated determination of the respective density of a plurality of solid-state test pieces. The automatic measuring machine comprises a measuring arrangement with a dry weighing device and a wet weighing device. The automatic measuring machine further comprises a test piece magazine for holding the plurality of solid-state test pieces. The automatic measuring machine further comprises a feeding unit for feeding the solid-state test pieces from the test piece magazine to the measuring arrangement. The automatic measuring machine is configured to use the feeding unit to sequentially feed the solid-state test pieces to the measuring arrangement. The automatic measuring machine is further configured to weigh the solid-state test pieces using the dry weighing device and the wet weighing device in order to obtain respective weighing measurement values for each solid-state test piece. The automatic measuring machine is further configured to determine a respective density value for each solid-state test piece on the basis of the respective weighing measurement values.

The automatic measuring machine described here makes it possible to efficiently determine the density of a plurality of solid-state test pieces. In particular, the automatic measuring machine is configured to determine the density of the solid-state test pieces fully automatically. In particular, the automatic measuring machine is configured to handle the solid-state test pieces for the determination of the density in a fully automated manner.

Advantageous embodiments are defined in the dependent claims.

Preferably, the automatic measuring machine comprises a measuring machine housing surrounding a working chamber in which the measuring arrangement and the test piece magazine are arranged.

Preferably, the automatic measuring machine further comprises a vibration damping suspension which supports the wet weighing device and is designed to damp mechanical vibrations originating from the environment of the automatic measuring machine in order to reduce their influence on the weighing measurement values.

Preferably, the automatic measuring machine comprises a frame structure with which the test piece magazine and the feeding unit are supported relative to a floor on which the automatic measuring machine stands, and wherein the wet weighing device is vibration-decoupled from the frame structure.

Preferably, the automatic measuring machine further comprises a working chamber floor on which the test piece magazine stands, wherein the working chamber floor comprises a wet weighing opening through which extends a wet weighing assembly comprising the vibration damping suspension and the wet weighing device.

Preferably, the test piece magazine comprises a plurality of test piece carriers, which each serve to receive a respective test piece, and wherein the feeding unit is configured to sequentially take the test piece carriers out of the test piece magazine in order to feed the test pieces in the respective test piece carrier to the measuring arrangement.

Preferably, the automatic measuring machine is configured to perform weighing of each test piece using the dry weighing device and the wet weighing device in a state in which the test piece is within a receiving area of the respective test piece carrier.

Preferably, the dry weighing device and/or the wet weighing device each comprise a test piece lifting structure which, for weighing a solid-state test piece, penetrate into the respective test piece carrier and, in particular when the respective test piece carrier is lowered, causes the solid-state test piece to be lifted relative to the test piece carrier.

Preferably, the wet weighing device comprises a basin filled with a liquid, a first weighing unit arranged outside the basin and a force transmission structure leading from the first weighing unit into the basin, which force transmission structure is adapted, when weighing a solid-state test piece with the wet weighing device, to transmit a force, which is exerted by the solid-state test piece in the liquid on the force transmission structure, from the basin to the first weighing unit.

Preferably, the wet weighing device comprises a/the basin as well as a first test piece lifting structure arranged in the basin, which first test piece lifting structure, when weighing a solid-state test piece, penetrate into a respective test piece carrier and, in particular when lowering the respective test piece carrier, causes the solid-state test piece to be lifted relative to the test piece carrier.

Preferably, the wet weighing device comprises a/the basin and a liquid level closed loop control device for closed loop controlling the liquid level of the basin.

Preferably, the automatic measuring machine is configured, for weighing the solid-state test piece with the wet weighing device, to immerse the solid-state test piece together with a/the respective test piece carrier in the liquid of the basin and to carry out the closed-loop control of the liquid level after the immersion of the test piece carrier.

Preferably, the wet weighing device comprises a/the basin and a surfactant is admixed to a/the liquid with which the basin is filled.

Preferably, the automatic measuring machine is adapted to perform, based on selection information indicating one or more test piece places of the test piece magazine, determination of density for those solid-state test pieces which are located at test the piece places indicated by the selection information.

Preferably, the automatic measuring machine comprises an interface, in particular a user interface, for inputting the selection information.

Preferably, a plurality of solid-state test pieces manufactured by means of additive manufacturing are arranged in the test piece magazine.

Preferably, the automatic measuring machine is configured to judge, on the basis of the determined density values, a manufacturing quality of the respective solid-state test piece and to provide judgment information.

The invention further relates to a manufacturing facility comprising a manufacturing hall, a manufacturing device arranged in the manufacturing hall for manufacturing solid-state test pieces, and an automatic measuring machine arranged in the manufacturing hall, which automatic measuring machine is configured as described above.

The invention further relates to a method for automated determination of a respective density of a plurality of solid-state test pieces, comprising the steps of: feeding, by means of a feeding unit, the solid-state test pieces from a test piece magazine to a measuring arrangement comprising a dry weighing device and a wet weighing device, weighing the solid-state test pieces using the dry weighing device and the wet weighing device to obtain, for each solid-state test piece, respective weighing measurement values, and determining, for each solid-state test piece, a respective density value based on the respective weighing measurement values.

The invention further relates to a method for judging the manufacturing quality of a solid-state test piece manufactured by additive manufacturing, comprising the steps of: weighing the solid-state test piece with a dry weighing device and a wet weighing device to obtain weighing measurement values, judging the manufacturing quality of the solid-state test piece based on the weighing measurement values, and providing judgment information on the manufacturing quality of the solid-state test piece. Expediently, the judgment information indicates whether the solid-state test piece achieves a predetermined manufacturing quality. Exemplarily, the judgment information indicates whether the solid-state test piece has an inclusion, such as an air inclusion. The solid-state test piece is, for example, a workpiece.

Further exemplary details as well as exemplary embodiments are explained below with reference to the figures. Thereby shows

DETAILED DESCRIPTION OF THE INVENTION

In the following, reference is made to the spatial directions "x-direction", "y-direction" and "z-direction" drawn in the figures, which spatial directions are aligned orthogonally to each other. The x-direction can also be referred to as the width direction, the y-direction as the depth direction, and the z-direction as the height direction. The x-direction and the y-direction are horizontal directions; the z-direction is a vertical direction.

Figure 1:
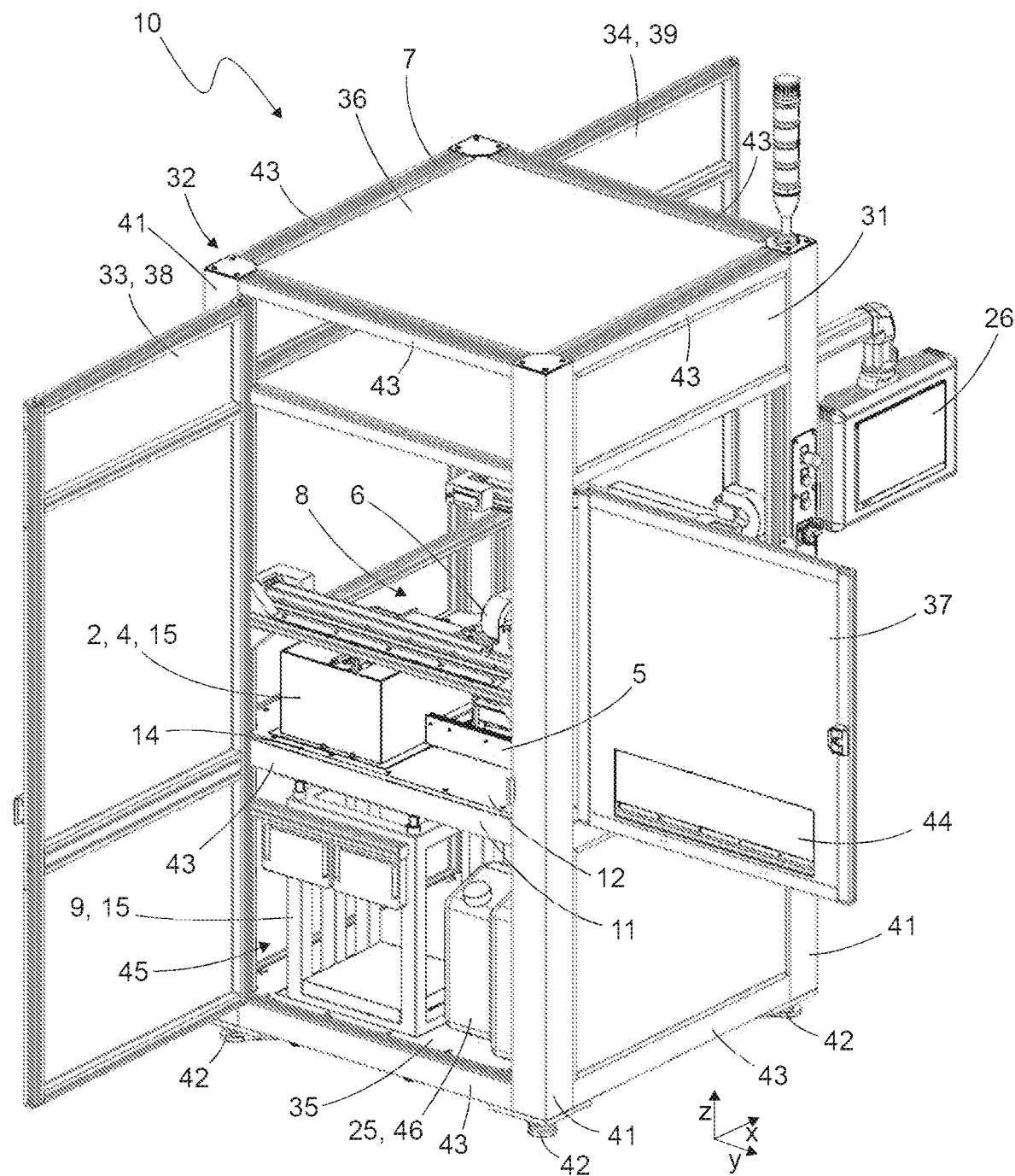
FIG. 1 a perspective view of an automatic measuring machine.
Figure 2:
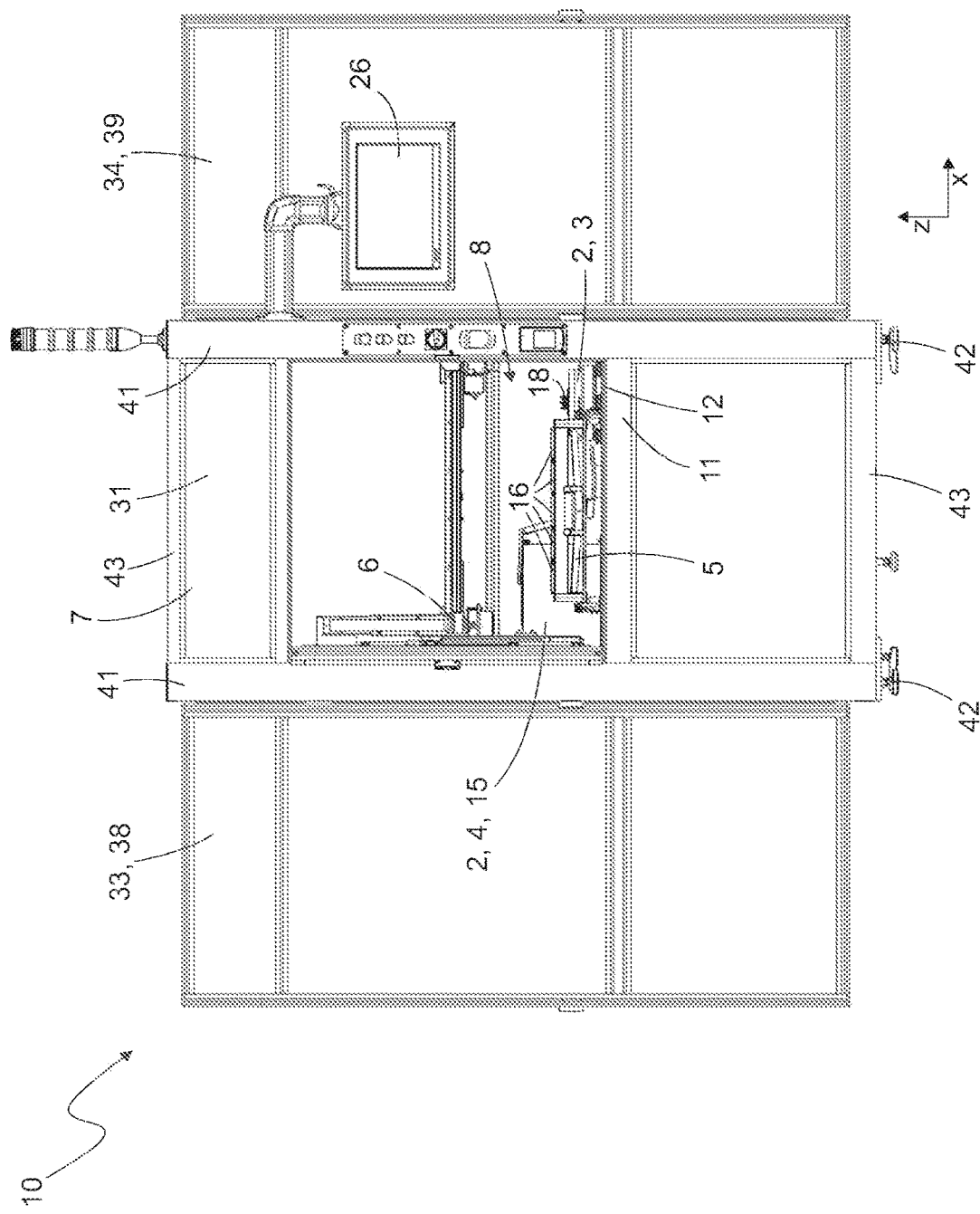
FIG. 2 a front view of the automatic measuring machine.
Figure 3:
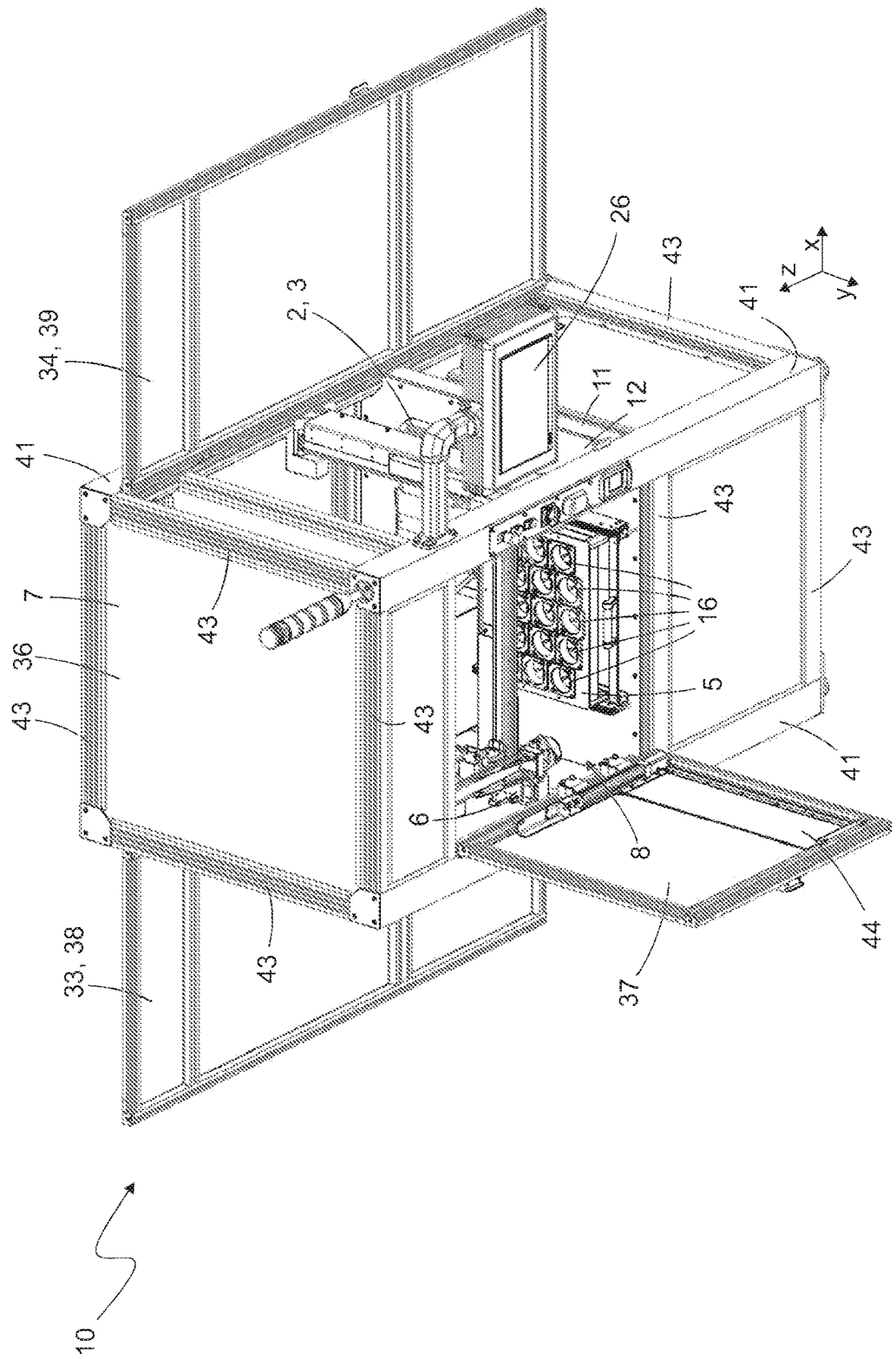
FIG. 3 a perspective view of the measuring machine from above.

FIGS. 1 to 3 show an automatic measuring machine 10 according to an exemplary embodiment. The automatic measuring machine 10 is configured in particular to perform an automated determination of the respective density of a plurality of solid-state test pieces 1. The automatic measuring machine 10 comprises a measuring arrangement 2 having a dry weighing device 3 and a wet weighing device 4. The automatic measuring machine 10 further comprises a test piece magazine 5 for holding the plurality of solid-state test pieces 1. The automatic measuring machine 10 further comprises a feeding unit 6 for feeding the solid-state test pieces 1 from the test piece magazine 5 to the measuring arrangement 2.

Preferably, the automatic measuring machine 10 is adapted to automatically convey the solid-state test pieces 1 from the test piece magazine 5 to the measuring arrangement 2 with the feeding unit 6. In particular, the automatic measuring machine 10 is adapted to convey the solid-state test pieces 1 sequentially from the test piece magazine 5 to the measuring arrangement 2. In particular, the automatic measuring machine 10 conveys the solid-state test pieces 1 one at a time from the test piece magazine 5 to the measuring arrangement 2, in particular (sequentially) to the dry weighing device 3 and to the wet weighing device 4 and then expediently back to the test piece magazine 5. Exemplarily, the automatic measuring machine 10 completes the feeding of a solid-state test piece 1 to the measuring arrangement 2 and back to the test piece magazine 5 before the automatic measuring machine 10 feeds a next solid-state test piece 1 to the measuring arrangement 2.

The automatic measuring machine 10 is expediently configured to automatically weigh the solid-state test pieces 1 using the dry weighing device 3 and the wet weighing device 4 in order to obtain respective weighing measurement values, in particular a dry weighing measurement value and a wet weighing measurement value, for each solid-state test piece 1. The automatic measuring machine 10 is preferably configured to determine, in particular to calculate, a respective density value for each solid-state test piece 1 in an automated manner on the basis of the respective weighing measurement values. According to a preferred embodiment, the automatic measuring machine 10 is configured to carry out the feeding and weighing of the solid-state test piece 1 and the determination of the density fully automatically, i.e. without user intervention.

Further exemplary details are to be explained below:

For example, the automatic measuring machine 10 is configured to calculate the density value based on the dry weighing measurement value and the wet weighing measurement value using Archimedes' principle. For example, the automatic measuring machine 10 is configured to use the following relationship:

$$\rho = \frac{F_l \rho_w - F_w \rho_l}{F_l - F_w},$$

Here $\rho$ the density of the solid-state test piece 1, $\rho_w$ the density of the liquid 19 of the wet weighing device 4, $\rho_l$ the density of the air (for example, in the working chamber 8), $F_l$ the weight of the solid-state test piece 1 in the air on which weight the dry weighing measurement is based, and $F_w$ the weight of the solid-state test piece 1 in the water on which weight the wet weighing measurement value is based.

According to a preferred embodiment, the automatic measuring machine 10 is configured to judge a manufacturing quality of the respective solid-state test piece 1 on the basis of the determined density value and to provide judgment information. For example, the automatic measuring machine 10 is configured to compare the determined density value with a preset value, in particular a preset value range, and to provide the judgement information on the basis of the comparison. The judgement information expediently indicates whether a solid-state test piece has a predetermined density and/or lies in a predetermined density range.

Expediently, the judgement of the manufacturing quality based on the density value is performed instead of a (conventional) manufacturing quality judgement by means of a sectional view. In particular, the automatic measuring machine 10 concludes on the basis of the density value whether the solid-state test piece 1 has one or more inclusions, for example air inclusions, and provides judgment information indicating this. The judgment of the manufacturing quality on the basis of the density value has, in particular, the advantage over the conventional sectional view judgment that it can be carried out non-destructively and/or more quickly.

In particular, the manufacturing quality judgement is performed for an additively manufactured solid-state test piece.

According to a possible embodiment, the automatic measuring machine 10 comprises a first temperature sensor that measures the temperature of the liquid 19, a second temperature sensor that measures the temperature of the air in the working chamber 8 and/or an air pressure sensor that measures the air pressure in the working chamber 8. The automatic measuring machine 10 is expediently configured to calculate the density taking into account one or more sensor values detected by means of the first temperature sensor, the second temperature sensor and/or the air pressure sensor.

Expediently, the automatic measuring machine 10 is configured to determine density with a repeatability of 0.5 mg/cm^3 or less and/or a resolution of 0.1 mg/cm^3 or less.

In the following, an exemplary composition of the automatic measuring machine 10 will be discussed in more detail. Exemplarily, the automatic measuring machine 10 comprises an automatic measuring machine housing 7. The automatic measuring machine 10, in particular the automatic measuring machine housing 7, has an a cuboidal basic shape, for example, wherein the height is expediently greater, in particular at least twice as great, as the width and/or depth of the automatic measuring machine. For example, the automatic measuring machine, in particular the automatic measuring machine housing 7, is at least 1.60 m high and/or at least 80 cm deep and/or wide.

The automatic measuring machine housing 7 comprises, by way of example, four circumferential walls: a front wall 31, a rear wall 32, a first side wall 33 and a second side wall 34. The circumferential walls are expediently fully closable and serve in particular to protect the measuring arrangement, in particular the wet weighing device 4, from air vibrations. The front wall 31 and the rear wall 32 are aligned parallel to one another, in particular perpendicular to the y-direction. The first side wall 33 and the second side wall 34 are aligned parallel to each other (when the associated doors are closed), in particular perpendicular to the x-direction. In an exemplary embodiment, the measuring machine housing 7 comprises a housing bottom 35 from which the four circumferential walls extend upward in the z-direction. The housing bottom is oriented perpendicular to the z-direction. The measuring machine housing 7 further comprises a housing ceiling 36, which expediently forms the upper end of the measuring machine housing 7 and up to which the circumferential walls extend vertically. The housing ceiling 36 is oriented perpendicular to the z-direction.

The front wall 31 comprises, by way of example, a front door 37, the first side wall 33 comprises, by way of example, a first side door 38, and the second side wall 34 comprises, by way of example, a second side door 39. The front door 37, the first side door 38 and/or the second side door 39 are expediently mounted so as to be pivotable about a respective pivot axis running parallel to the z-direction. In FIGS. 1 to 3, the front door 37, the first side door 38 and the second side door 39 are shown in an open state. In the front wall 31, in particular the front door 37, a loading opening 44, in particular a loading hatch, is provided by way of example, via which loading of the automatic measuring machine 10 with solid-state test pieces 1 is possible. It is expedient that the automatic measuring machine 10 has an opening mechanism for automatically opening and/or closing the loading opening 44.

The automatic measuring machine 10 comprises a frame structure 11 with which the dry weighing device 3, the test piece magazine 5 and/or the feeding unit 6 are supported relative to the floor on which the automatic measuring machine 10 stands. The frame structure 11 is designed in particular as a base frame. Exemplarily, the frame structure 11 forms part of the automatic measuring machine housing 7. Exemplarily, the frame structure 11 comprises four elongate vertical support elements 41 aligned in the z-direction, which are preferably designed as continuous cast profiles, in particular as continuous cast aluminum profiles. The vertical support elements 41 form, in an exemplary manner, the edges of the cuboidal basic shape of the automatic measuring machine 10, which edges extend parallel to the z-direction. Stand feet 42 are arranged, in an exemplary manner, on the underside of the vertical support elements 41. The frame structure 11 further comprises a plurality of elongate horizontal support elements 43, exemplarily at least four, eight or twelve horizontal support elements 43. The horizontal support elements 43 are each oriented in a horizontal direction and are expediently designed as continuous cast profiles, in particular as continuous cast aluminum profiles. The horizontal support elements 43 are supported by the vertical support elements 41 and are in particular fastened to the latter. Conveniently, four horizontal support elements 43 are arranged at the same height in each case and together form in particular a rectangular or square frame. Preferably, the housing bottom 35 and/or the housing ceiling 36 is supported by the vertical support elements 41 and/or the horizontal support elements 43. The automatic measuring machine 10 further comprises a working chamber floor 12, which is expediently supported by the vertical support elements 41 and/or the horizontal support elements 43.

The automatic measuring machine 10 comprises a working chamber 8, in which the test piece magazine 5, the measuring arrangement 2, in particular the dry weighing device 3 and the wet weighing device 4, and the feeding unit 6 are expediently arranged. Exemplarily, the working chamber 8 has a cuboidal basic shape. The working chamber 8 is surrounded by the automatic measuring machine housing 7, in particular the peripheral walls. The automatic measuring machine 10 is expediently designed to place the working chamber 8 in a state completely closed off from the environment of the automatic measuring machine 10, for example by closing the loading opening 44. In this state, the wet weighing device 4 is protected from air vibrations. Downwardly, the working chamber 8 is bounded by the working chamber floor 12. The test piece magazine 5 and the dry weighing device 3 are conveniently located on the working chamber floor 12. Exemplarily, the working chamber 8 occupies at least 30%, in particular at least 50%, of the vertical extent of the automatic measuring machine housing 7. The working chamber floor 12 is exemplarily at a height of at least 20% of the height of the automatic measuring machine housing 7. Preferably, the working chamber 8 is at a suitable working height for a standing user, so that a standing user can reach into the working chamber 8, for example through the loading opening 44.

The working chamber 8 surrounded by the peripheral walls serves in particular to protect the wet weighing device 4 from air vibrations of the environment of the automatic measuring machine 10. This can prevent the measuring results from being impaired by air vibrations. Since the test piece magazine 5 is located in the working chamber 8, a rapid transport of the solid-state test pieces 1 to the measuring arrangement 2 can be achieved.

The automatic measuring machine 10 further comprises a supply chamber 45. The supply chamber 45 is surrounded by the automatic measuring machine housing 7, in particular the peripheral walls. The supply chamber 45 is located in particular below the working chamber 8. Exemplarily, the supply chamber 45 is bounded upwardly by the working chamber floor 12 and downwardly expediently by the housing bottom 35.

Exemplarily, the automatic measuring machine 10 comprises at least one liquid container 46, which is expediently arranged in the supply chamber 45. The liquid container 46 expediently comprises liquid for the wet weighing device 4 and is expediently fluidically connected to the wet weighing device 4, in particular via a pump. The liquid container 46 is exemplarily part of a liquid level closed loop control device 25.

According to a possible embodiment, the liquid container 46 is a supply container and the automatic measuring machine may additionally comprise a drain container, which may be arranged in the supply chamber 45. The automatic measuring machine is expediently designed to convey liquid from the supply container into the basin 21 and/or to drain liquid 19 from the basin 21 into the drain container, in particular by means of the liquid level closed loop control device 25. Exemplarily, the automatic measuring machine 10 comprises an interface 26, which is designed in particular as a user interface. Exemplarily, the interface 26 comprises a display and/or a control device. Preferably, the interface 26 comprises a touch screen. Exemplarily, the interface 26, in particular the user interface, is attached to the outside of the automatic measuring machine housing 7, preferably at the level of the working chamber 8.

Preferably, selection information determining one or more test piece places of the test piece magazine 5 can be input via the interface 26. The automatic measuring machine 10 is expediently configured to determine the density for the solid-state test pieces 1 located at the test piece places determined by the selection information.

Expediently, the automatic measuring machine 10 is configured to output, in particular to display, the weighing measurement values and/or the density value and/or the judgement information via the interface 26.

Figure 4:
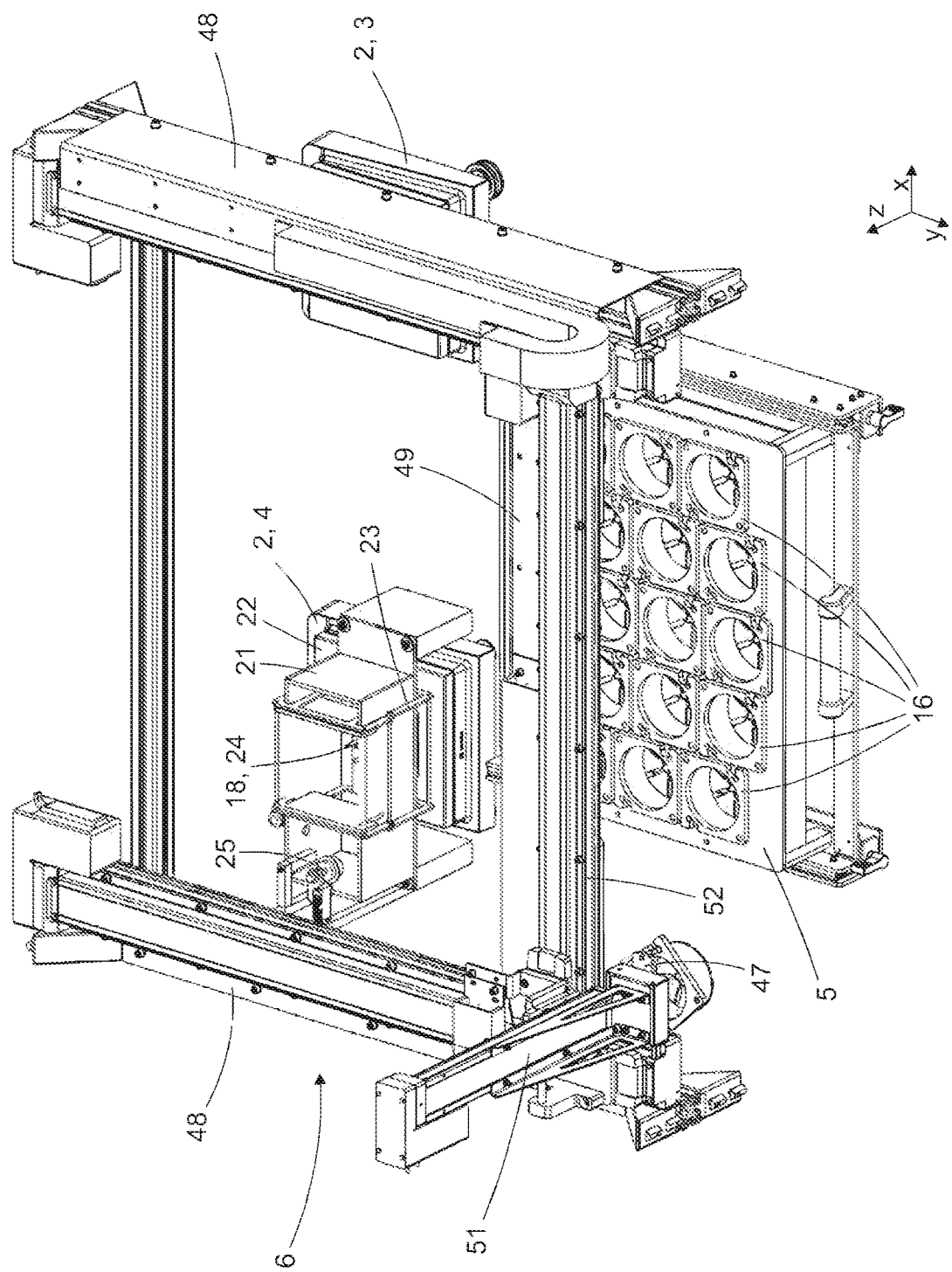
FIG. 4 a perspective view of an arrangement of a feeding unit, a test piece magazine, a dry weighing device and a wet weighing device, FIG. 5 a perspective view of an arrangement of the test piece magazine, the dry weighing device and the wet weighing device, FIG. 6 a perspective view of the test piece magazine, FIG. 7 a perspective view of a wet weighing assembly with a cover, FIG. 8 a perspective view of the wet weighing assembly without cover, FIG. 9 a perspective view of a basin and a force transmission structure of the wet weighing device, FIG. 10 a perspective view of the basin with inserted test piece carrier and gripper, FIG. 11 a sectional view of the basin with inserted test piece carrier and gripper, FIG. 12 a top view of the basin with the test piece carrier inserted, without gripper and without solid-state test piece, FIG. 13 a perspective view of the dry weighing device, FIG. 14 a perspective view of the dry weighing device with the test piece carrier and gripper put on, FIG. 15 a front view of the dry weighing device with the test piece carrier and gripper put on, FIG. 16 a schematic representation of a manufacturing line, and FIG. 17 a flow chart of a process.

FIG. 4 shows how the measuring arrangement 2, the test piece magazine 5 and the feeding unit 6 are arranged relative to each other. Exemplarily, the measuring arrangement 2 and the test piece magazine 5 are located in the same x-y plane and are arranged offset to each other in x-direction and/or y-direction. Exemplarily, the test piece magazine 5 is arranged in front of the measuring arrangement 2 in the y-direction. The dry weighing device 3 and the wet weighing device 4 are expediently spaced apart from each other and expediently arranged offset from each other in the x-direction. The feeding unit 6 is expediently arranged in the z-direction above the working chamber floor 12, in particular above the measuring arrangement 2 and/or the test piece magazine 5.

The feeding unit 6 is exemplarily designed as a robot device, in particular as a gantry robot. Expediently, the feeding unit 6 comprises a gripper 47 that can be moved in an x-y plane and expediently in the z-direction. The feeding unit 6 comprises exemplarily four axes: two horizontal axes, which are expediently aligned orthogonally to each other and of which exemplarily one runs parallel to the x-axis and another runs parallel to the y-axis, a vertical axis and a rotary axis running in particular parallel to the z-direction.

The feeding unit 6 is expediently configured to sequentially take test piece carriers 16 out of the test piece magazine 5 in order to sequentially feed the solid-state test pieces 1 in a respective test piece carrier 16 to the measuring arrangement 2. In particular, the feeding unit 6 is configured to feed each solid-state test piece 1 in the respective test piece carrier to the dry weighing device 3 and the wet weighing device 4, in order to enable the respective weighing of the solid-state test piece 1 there in the test piece carrier 16. Expediently, the feeding unit 6 is designed to immerse the solid-state test piece 1 together with the test piece carrier 16 and expediently the gripper 47 in the liquid 19 of the wet weighing device 4 for weighing the solid-state test piece 1 with the wet weighing device 4. The gripper 47 is at least partially being immersed in the liquid 19.

Exemplarily, the feeding unit 6 comprises two linear guides 48 that run parallel to each other, in particular parallel to the y-direction. The feeding unit 6 comprises a carriage, in particular a gantry carriage, which can be moved along the linear guides 48, in particular in the y-direction. The carriage 49 comprises a gripper arm 51 and a transverse guide 52 which runs orthogonally to the linear guides 48 and along which the gripper arm 51 can be moved. The gripper arm 51 comprises the gripper 47, which is expediently movable in the z-direction and/or rotatable about the axis of rotation running parallel to the z-direction.

Figure 14:
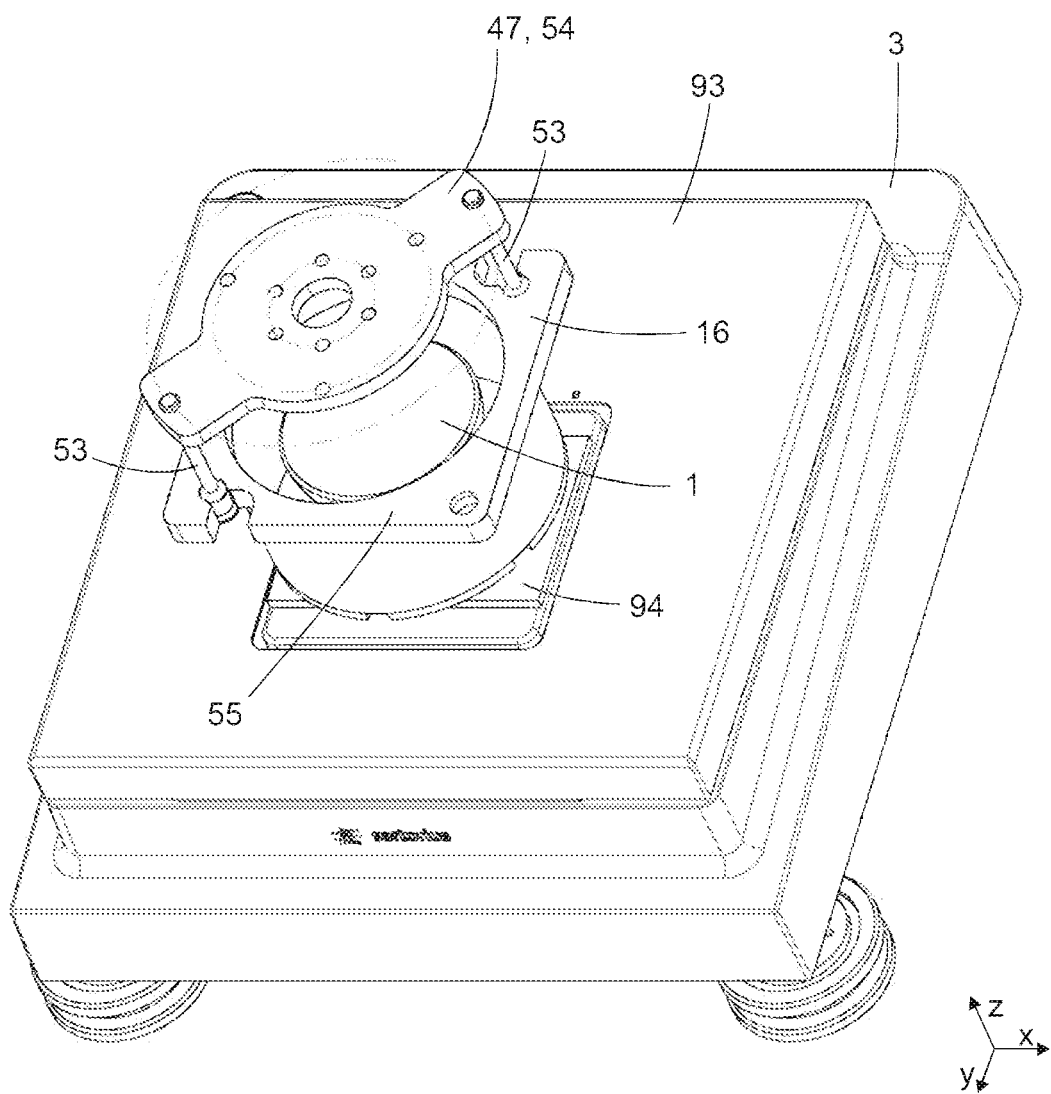
Figure 15:
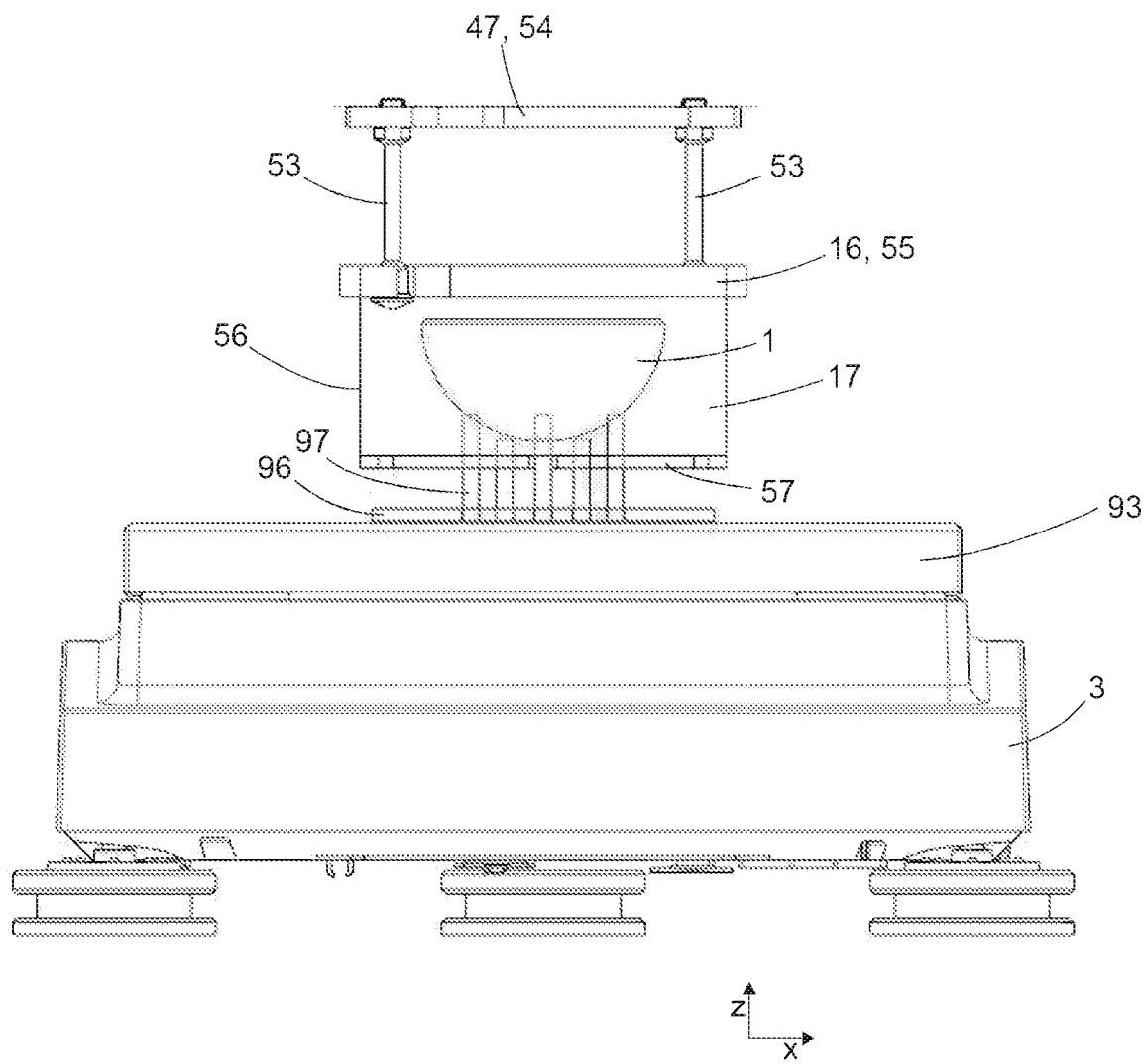

The gripper 47 can be seen in particular in FIGS. 14 and 15. The gripper 47 comprises at least one gripping element 53 which can be brought into engagement with a test piece carrier 16. Exemplarily, the gripper 47 comprises two gripping elements 53 which are expediently pin-shaped and/or project downwardly in the z-direction. Preferably, the feeding unit 6 is configured to perform a gripping movement with the gripper 47 in order to bring the gripping elements 53 into engagement with the test piece carrier 16. In particular, the gripping movement comprises a rotation of the gripper 47 about the axis of rotation running parallel to the z-direction. Exemplarily, the gripper 47 comprises a gripper plate 54 from which the gripping elements 53 extend downwardly.

Figure 5:
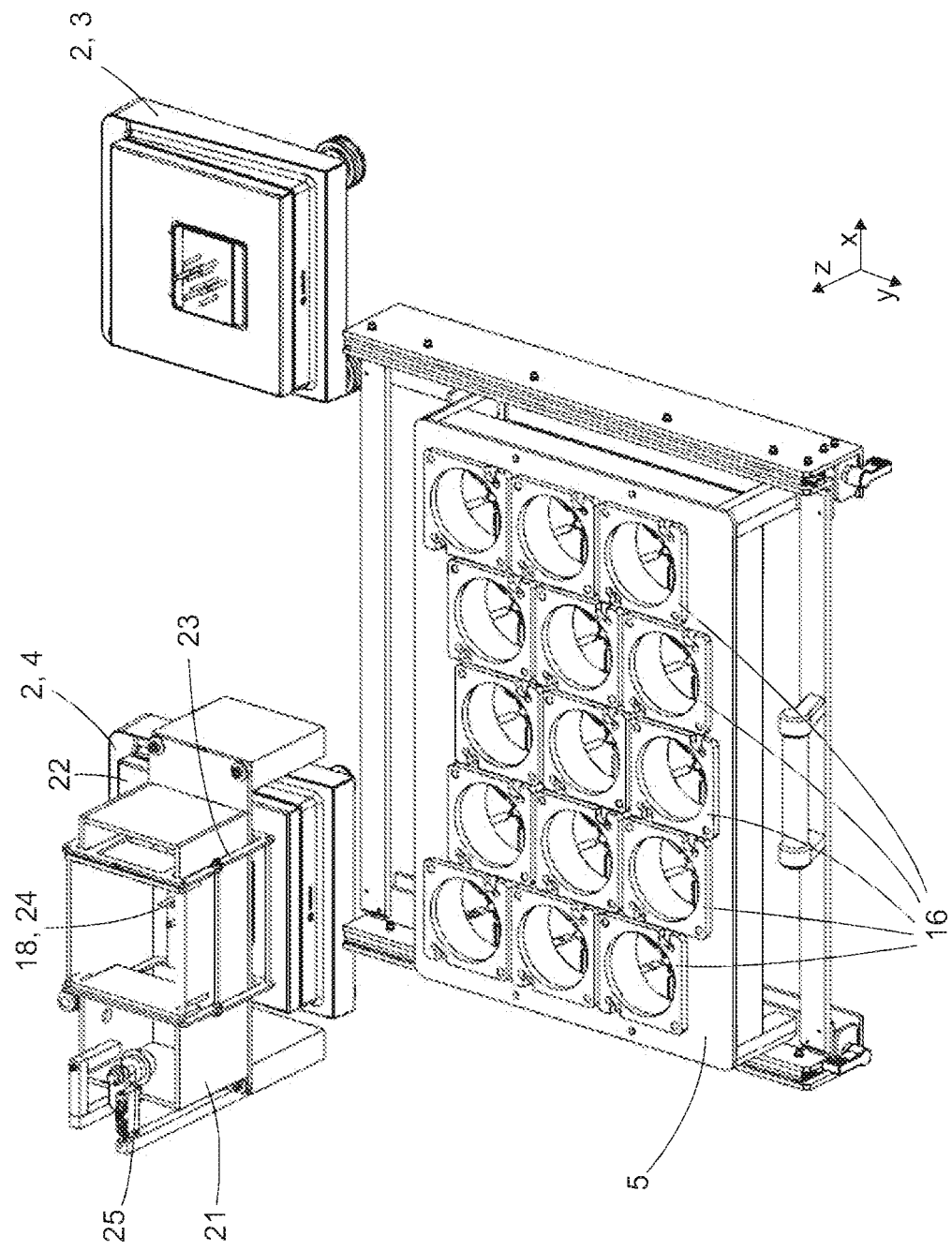

FIG. 5 shows the arrangement of FIG. 4 without the feeding unit 6. The test piece magazine 5, the dry weighing device 3 and the wet weighing device 4 are arranged in the same x-y plane (in particular in the working chamber 8) and horizontally offset to each other.

Figure 6:
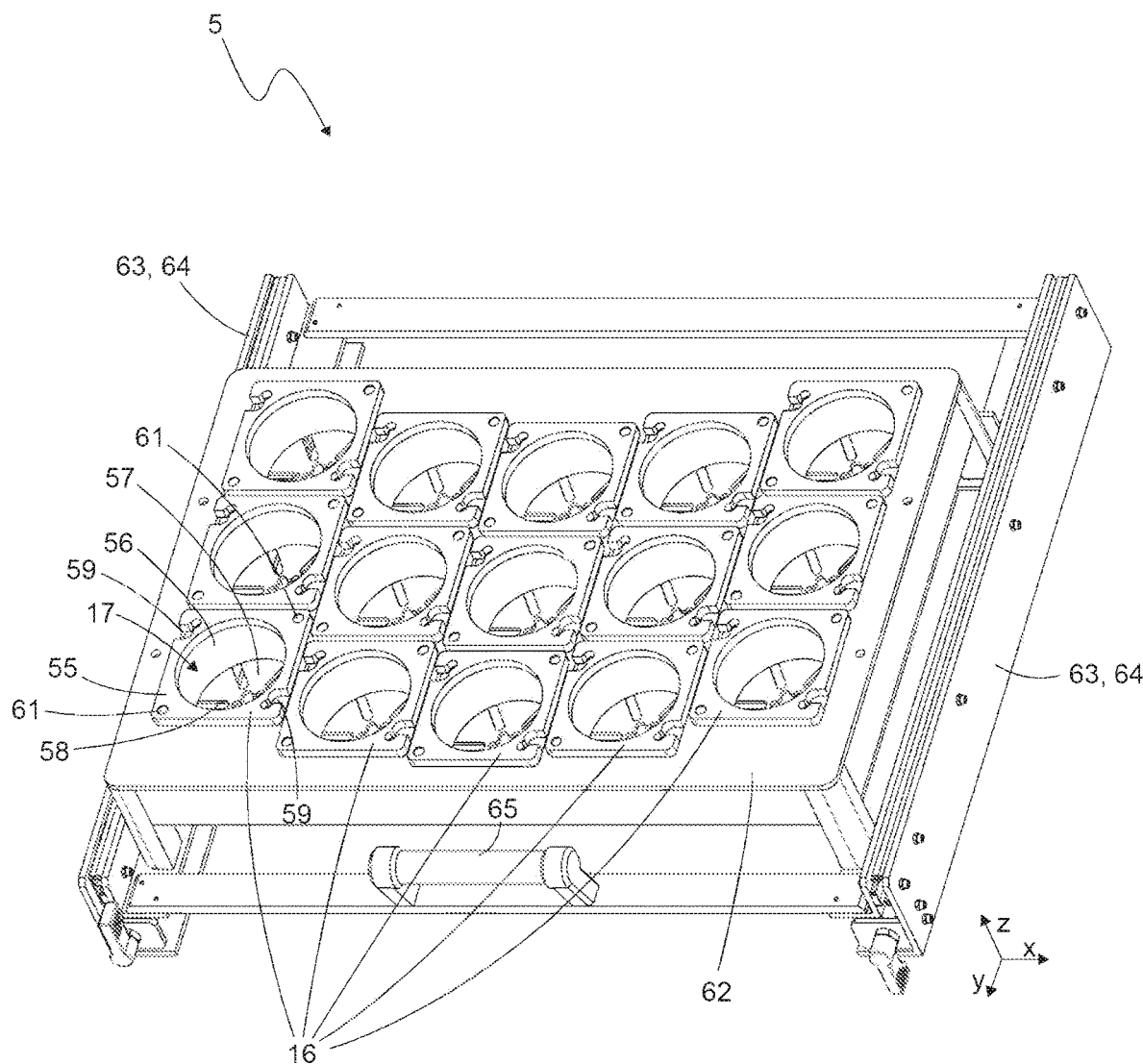

FIG. 6 shows an exemplary design of the test piece magazine 5 in detail. The test piece magazine 5 comprises a plurality of test piece places, each of which can accommodate a solid-state test piece. Exemplarily, the test piece places are distributed in an x-y plane. Exemplarily, each test piece place is provided by a respective test piece carrier 16. The test piece magazine 5 expediently comprises a plurality of test piece carriers 16, which are exemplarily arranged distributed in an x-y plane. Exemplarily, at least 5, in particular at least 10 or at least 15 test piece places and/or test piece carriers 16 are provided. For the sake of visibility, only the front test piece carriers 16 are provided with the reference sign "16" in the figures.

Each test piece carrier 16 serves to hold one, in particular only one, solid-state test piece 1. The test piece carriers 16 are exemplarily designed as transport baskets.

According to a preferred embodiment, a plurality of solid-state test pieces 1 manufactured by means of additive manufacturing are arranged in the test piece magazine 5. The solid-state test pieces 1 are, for example, workpieces.

The solid-state test pieces 1 have, for example, a cubic, spherical or hemispherical basic shape. The solid-state test pieces 1 can further have any basic shape.

Figure 12:
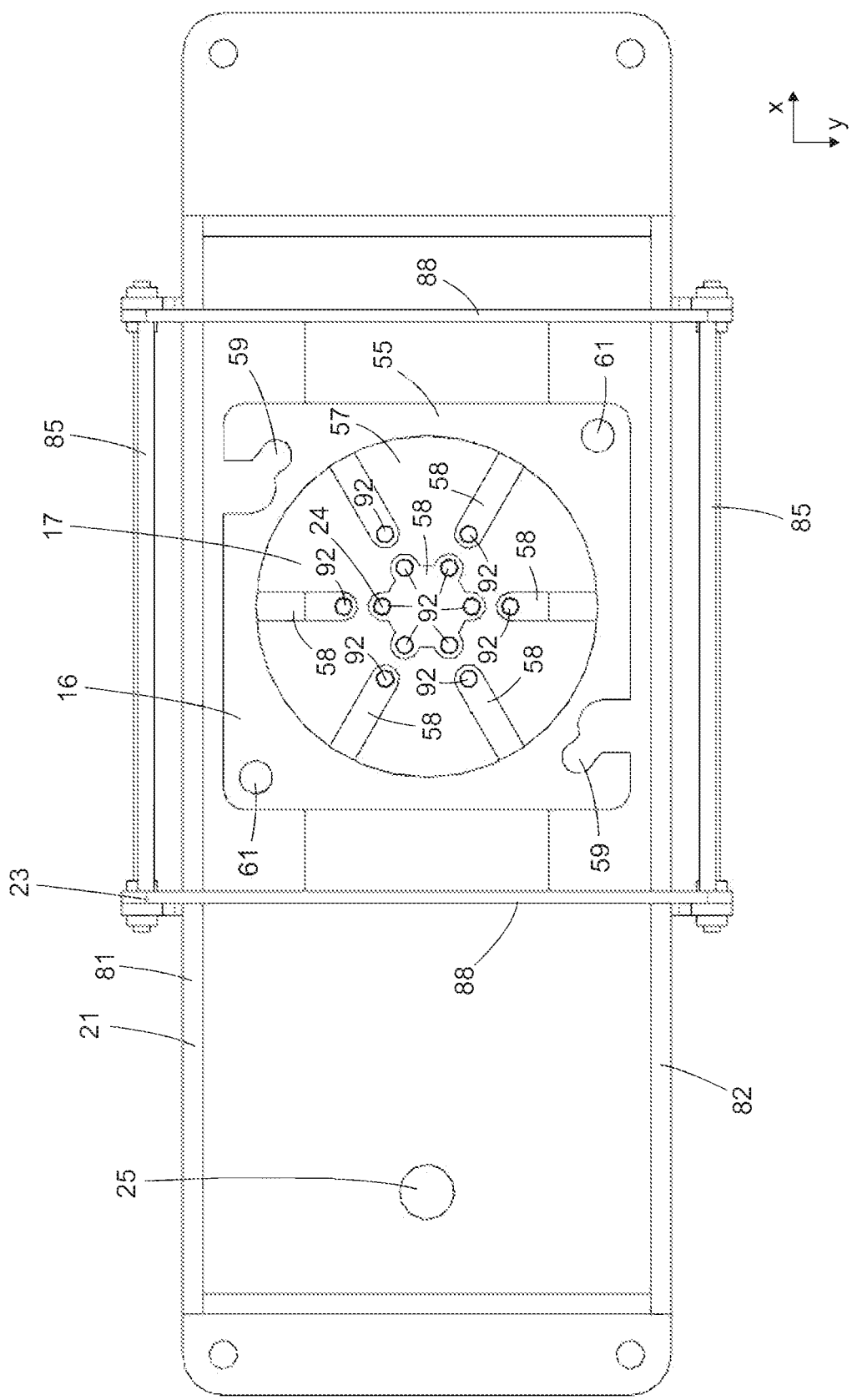

Each test piece carrier 16 expediently comprises a receiving area 17 for receiving a solid-state test piece 1. Exemplarily, the receiving area 17 is designed as a receiving chamber, in particular as a cylindrical receiving chamber. Each test piece carrier 16 comprises, by way of example, a carrier plate 55, which is aligned with its plate plane in particular perpendicular to the z-direction. In each carrier plate 55 there is an exemplary circular aperture which exposes the receiving area 17, in particular the receiving chamber. Each receiving area 17 is expediently bounded laterally by a tube section 56 which extends downwardly from the carrier plate 55. Downwardly, the receiving area 17 is bounded by a carrier bottom 57, which is exemplarily circular in shape. One or more carrier bottom apertures 58 are provided in the carrier bottom 57. The carrier bottom apertures 58 can be seen in particular in FIG. 12. Exemplarily, the carrier bottom apertures 58 comprise a plurality of radially extending slot-shaped apertures and a centrally disposed aperture. The slot-shaped apertures are arranged at equal angular distances and extend expediently in each case to the outer edge of the carrier bottom 57. The longitudinal axes of the slot-shaped apertures meet expediently in the center of the centrally arranged aperture.

Each test piece carrier 16, in particular each carrier plate 55, expediently further comprises at least one engagement structure 59 and/or at least one fixing structure 61. Exemplarily, two engagement structures 59 are present in each test piece carrier 16, which are expediently designed as lateral recesses in the carrier plate 55. The engagement structures 59 serve to be brought into engagement with the gripping elements 53. Exemplarily, two fixing structures 61 are also present, which are exemplarily designed as openings in the carrier plate 55. The fixing structures 61 serve to be brought into engagement with, in particular, pin-shaped fixing elements of the test piece magazine 5, so as to be rotationally fixed (about a vertical axis of rotation), so that the test piece carrier 16 does not rotate with the gripping elements 53 during the gripping movement of the gripper 47, during which the gripping elements 53 are brought into engagement with the engagement structures 59.

The test piece magazine 5 comprises an exemplary receiving section 62 for receiving the test piece carriers 16. The receiving section 62 is designed in particular as a tray. The upper side of the receiving section 62 represents an x-y receiving plane (aligned perpendicular to the z-direction) in which the test piece carriers 16 are arranged offset from one another in the x-direction and/or y-direction; i.e. they do not overlap in the x-direction and y-direction. Expediently, the pin-shaped fixing elements are arranged on the upper side of the receiving section 62.

Returning to FIG. 6, the test piece magazine 5 further comprises a pull-out 63 by means of which the receiving section 62 can be extended from the working chamber 8, in particular through the loading opening 44. Expediently, the pull-out 63 enables the receiving section 62 to be moved in the y-direction. The pull-out 63 expediently comprises two pull-out rails 64 arranged parallel to one another, which are aligned in particular parallel to the y-direction. The receiving section 62 is expediently arranged between the two pull-out rails 64.

The test piece magazine 5 further comprises a handle 65 with which the receiving section 62 can be operated by a user in order to move the receiving section 62 by means of the pull-out 63. The handle 65 is arranged exemplarily in front of the receiving section 62 in the y-direction and expediently in the center of the receiving section 62 in the x-direction.

In the following, the wet weighing device 4 will be discussed in more detail.

Figure 7:
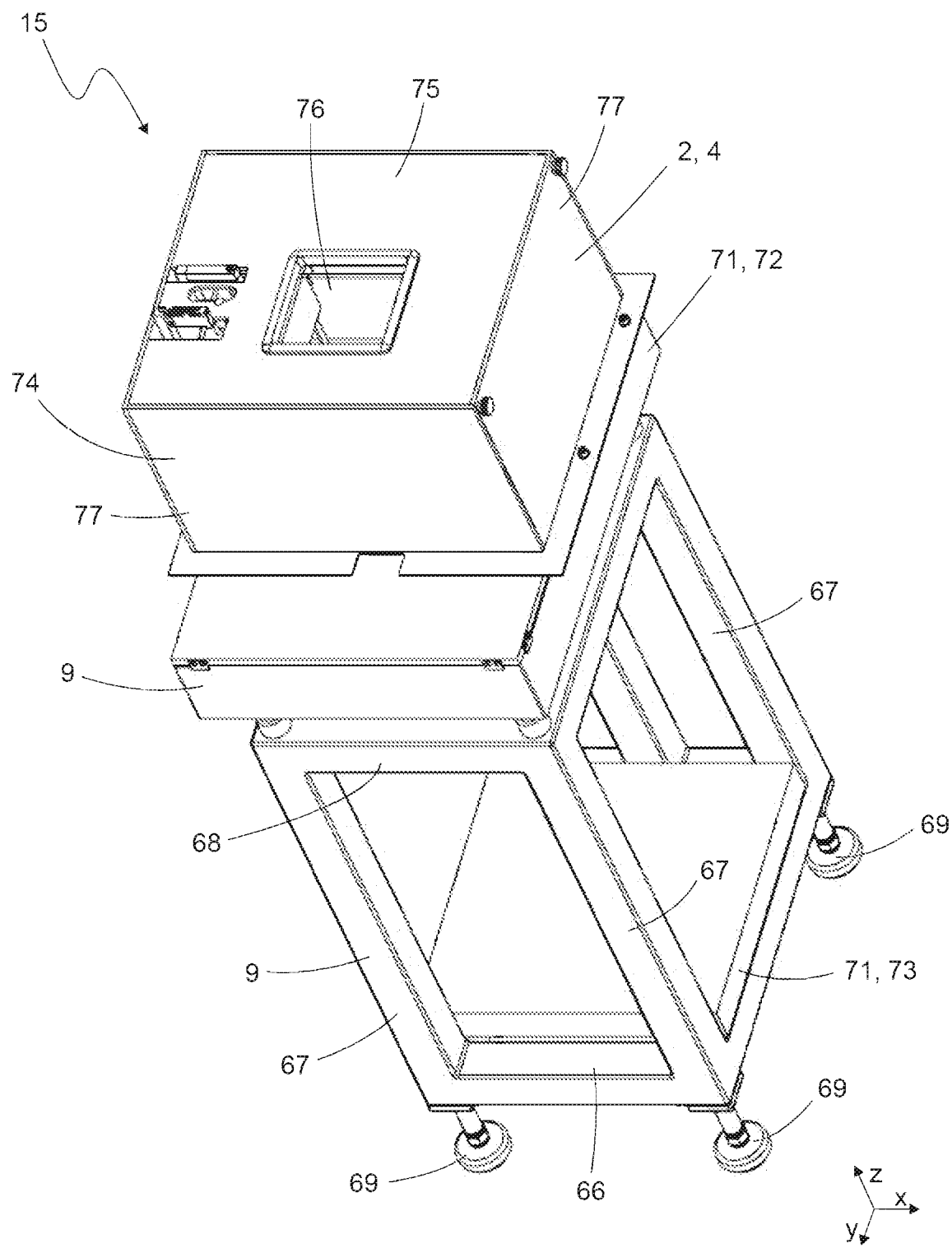
Figure 8:
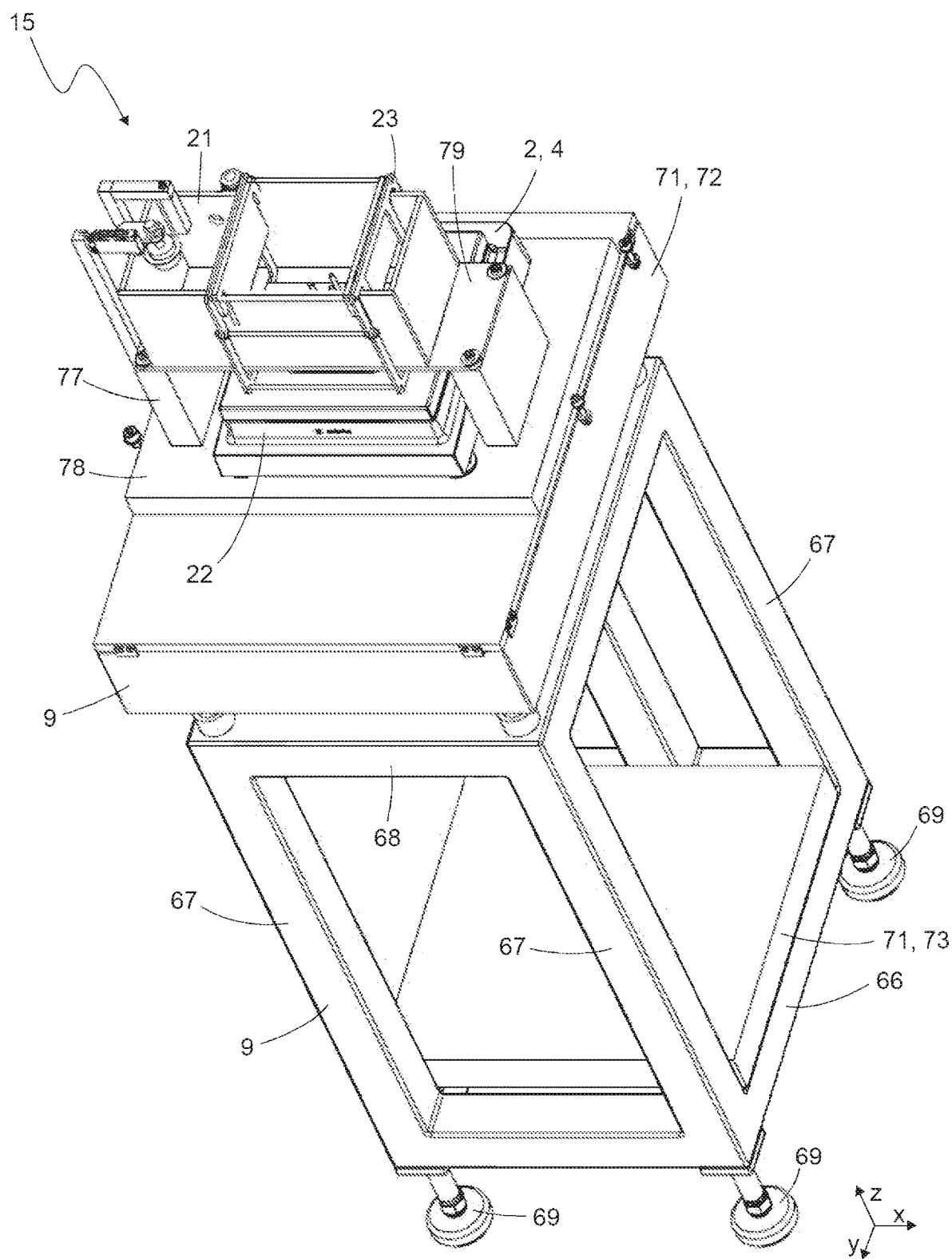

First, the suspension of the wet weighing device 4 shall be discussed. Exemplarily the automatic measuring machine 10 comprises a wet weighing assembly 15 which includes the wet weighing device 4 and a vibration damping suspension 9. In particular, the wet weighing assembly 15 is shown in FIGS. 7 and 8. Exemplarily, the wet weighing device 4 stands on the vibration damping suspension 9. The vibration damping suspension 9 expediently stands on the same floor as the frame structure 11 and/or the automatic measuring machine 10. Exemplarily, the vibration damping suspension 9 is designed as a frame. In an exemplary embodiment, the vibration damping suspension 9 comprises a frame floor 66 from which a plurality of vertical frame sections 67 extend vertically upward. The vertical frame sections 67 support a frame platform 68. The vibration damping suspension 9 further comprises a plurality of frame feet 69 by which the vibration damping suspension 9 rests on the floor. In an exemplary embodiment, the vibration damping suspension 9 is (at least partially) disposed within the supply chamber 45.

The vibration damping suspension 9 expediently comprises at least one vibration damping mass 71. Exemplarily, the vibration damping suspension 9 comprises an upper vibration damping mass 72 and/or a lower vibration damping mass 73. The vibration damping masses 71 are expediently each designed as a weight plate, preferably as a stone plate, in particular granite plate, and/or as a steel plate. The vibration damping masses 71 expediently have a density of at least 2 g/cm^3, preferably of at least 7 g/cm^3. The upper vibration damping mass 72 is expediently arranged between the frame platform 68 and the wet weighing device 4. Exemplarily, the wet weighing device 4 stands on the upper vibration damping mass 72 and the upper vibration damping mass 72 rests on the frame platform 68. Exemplarily, the lower vibration damping mass 73 is arranged on the frame floor 66.

The vibration damping suspension 9 is designed to damp mechanical vibrations originating from the environment of the automatic measuring machine 10 in order to reduce their influence on the weighing measurement values. The damping of the vibrations is achieved in particular by means of the at least one vibration damping mass 71. Expediently, the vibration damping suspension 9 prevents vibrations of the floor on which the frame structure 11 and the vibration damping suspension 9 stand from being transmitted to the wet weighing device 4. The vibration damping suspension 9 is designed in particular to damp vibration frequencies of over 2 Hz, in particular in such a way that these do not influence the measurement with the wet weighing device 4.

In particular, the wet weighing device 4 is suspended differently than the dry weighing device 3, the feeding unit 6 and/or the test piece magazine 5. While the test piece magazine 5, the feeding unit 6 and, in an exemplary manner, the dry weighing device 3 are supported with the frame structure 11 relative to the floor on which the automatic measuring machine 10 stands, the wet weighing device 4 is supported relative to the floor via the vibration damping suspension (and in particular not via the frame structure 11). The wet weighing device 4 and in particular the 2) vibration damping suspension 9 are expediently decoupled from the frame structure 11.

Exemplarily, the working chamber floor 12 on which the test piece magazine 5 stands comprises a wet weighing opening 14, in particular an aperture. The wet weighing assembly 15 extends through the wet weighing opening 14. Expediently, the wet weighing assembly 15 extends through the wet weighing opening 14 from the supply chamber 45 into the working chamber 8.

The wet weighing device 4 expediently comprises a basin 21 in which a liquid 19, in particular water, is present. Furthermore, the liquid 19 may also be ethanol or another liquid. Expediently, the density of the liquid 19 is lower than the density of the solid-state test piece 1. When weighing the solid-state test piece 1 with the wet weighing device 4, the solid-state test piece 1 is expediently immersed in the liquid 19 in the basin 21, in particular completely. Exemplarily, a surfactant is admixed to the liquid 19, in particular to the water. The surfactant can reduce, in particular prevent, bubble formation in the liquid 19, which can increase the accuracy of the measurement. The surfactant is expediently silicone-free. Preferably, the surfactant is a mixture of a wetting agent and a defoamer.

For example, the liquid 19, in particular the water, comprises a wetting agent, in particular a silicone-free substrate wetting agent, expediently in a concentration of 0.2% by volume. The substrate wetting agent expediently comprises alcohol alkoxylates or consists thereof. The wetting agent is, for example, BYK-DYNWET 800 N from BYK.

Expediently, the automatic measuring machine 10 is configured to change the liquid 19 in an automated manner, for example time-controlled and/or number-of-measurements-controlled.

The wet weighing device 4 optionally further comprises a cover 74 for covering the basin 21. In FIG. 7, the wet weighing device 4 is shown with the cover 74 and in FIG. 8 without the cover 74. The cover 74 is preferably a cover hood. Exemplarily, the cover has a cuboidal basic shape with, in particular, an open underside. The cover 74 comprises a cover upper side 75, in which a carrier opening 76 is expediently located, through which a test piece carrier 16 can be lowered into the basin 21. The carrier opening 76 suitably occupies less than one-third of the area of the cover upper side 75. In an exemplary embodiment, the cover 74 comprises closed cover perimeter walls 77. The cover 74 is suitably put over the basin 21. Preferably, the cover 74 is put over the basin 21, a force transmission structure 23 and a first weighing unit 22.

The cover 74 serves as an additional enclosure for the wet weighing device 4 (in addition to the peripheral walls of the automatic measuring machine housing 7) and expediently prevents air movements from setting the liquid 19 in the basin 21 in motion and thereby disturbing the measurement.

The wet weighing device 4 comprises the first weighing unit 22, which is exemplarily designed as a laboratory precision scale. The wet weighing device 4 further comprises, exemplarily, a basin support structure 77 which supports the basin 21. The first weighing unit 22 and the basin support structure 77 are expediently placed on the same support, exemplarily on a wet weighing floor 78, in particular in the form of a plate. The wet weighing floor 78 is exemplarily placed on the upper vibration damping mass 72. The first weighing unit 22 comprises a first force receiving section and is configured to detect the force exerted on the first force receiving section and to provide a weighing measurement value, in particular the wet weighing measurement value, based on the detected force. In particular, the force receiving section is disposed on the upper surface of the first weighing unit 22. Exemplarily, the force transmitting structure 23 extends from the interior of the basin 21 to the force receiving section. The basin support structure 77 extends exemplarily across the upper side of the first weighing unit 22, in particular across the force receiving section. The basin support structure 77 suitably comprises a basin support plate 79 on which the basin 21 stands and which runs across the first weighing unit 22, in particular across the force receiving section.

Figure 9:
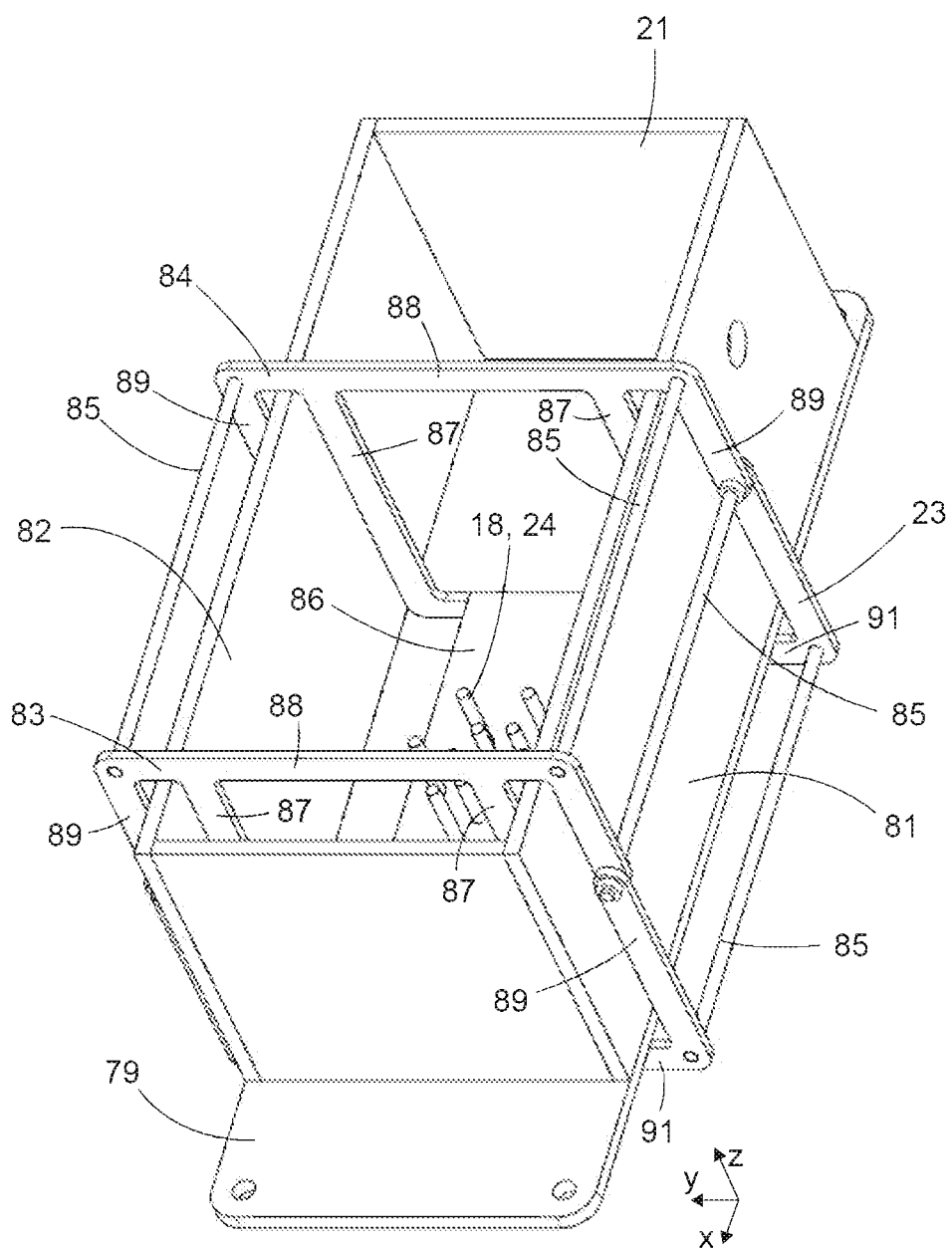
Figure 10:
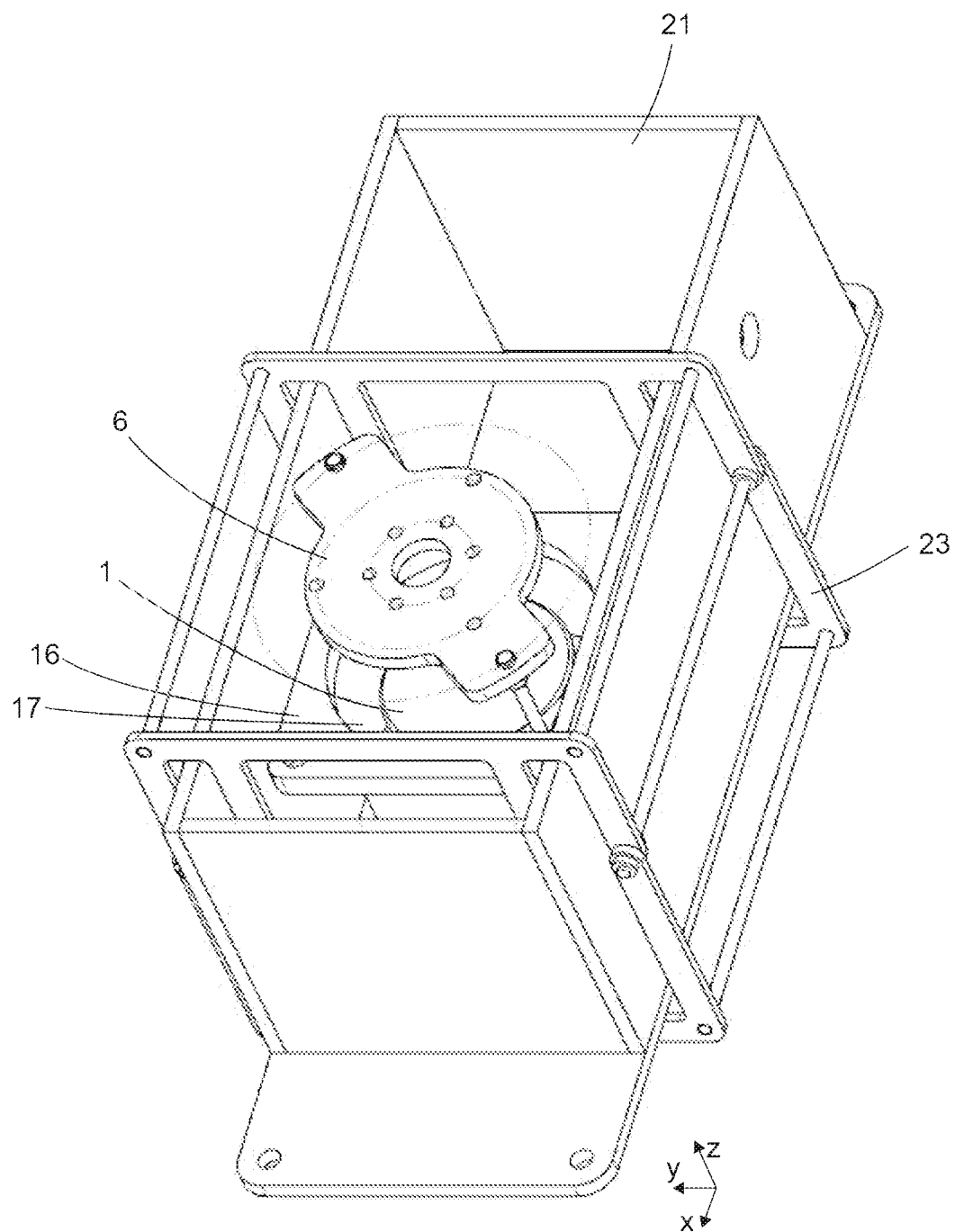

FIG. 9 shows an exemplary design of the basin 21 and the force transmission structure 23 in detail. Exemplarily, the basin 21 is of cuboidal design and expediently has an open top. The force transmission structure 23 may also be referred to as a skeleton. The force transmission structure 23 leads exemplarily from the interior of the basin 21, in particular from the liquid 19, out of the open upper side of the basin 21 and then leads downwards, expediently to below the basin 21, in particular to below the basin support plate 79. In particular, the force transmission structure 23 comprises a first closed contour 83 running from within the basin 21, in particular out of the fluid 19, out of the open top of the basin 21, then downwardly along a first basin peripheral wall 81 to below the basin 21, in particular below the basin support plate 79, then passes underneath the basin 21, in particular underneath the basin support plate 79, and runs upwardly along a second basin peripheral wall 82 arranged parallel to the first basin peripheral wall 81 and through the open top of the basin 21 into the basin 21, in particular the liquid 19. The force transmission structure 23 expediently further comprises a second closed contour 84, which is expediently designed to correspond to the first closed contour 83 and which is expediently arranged horizontally offset, in particular offset in the y-direction, with respect to the first closed contour 83. The first closed contour 83 and the second closed contour 84 are connected to one another, in an exemplary manner, by connecting elements 85, in particular rod-shaped connecting elements 85, which run in particular parallel to the x-direction.

Figure 11:
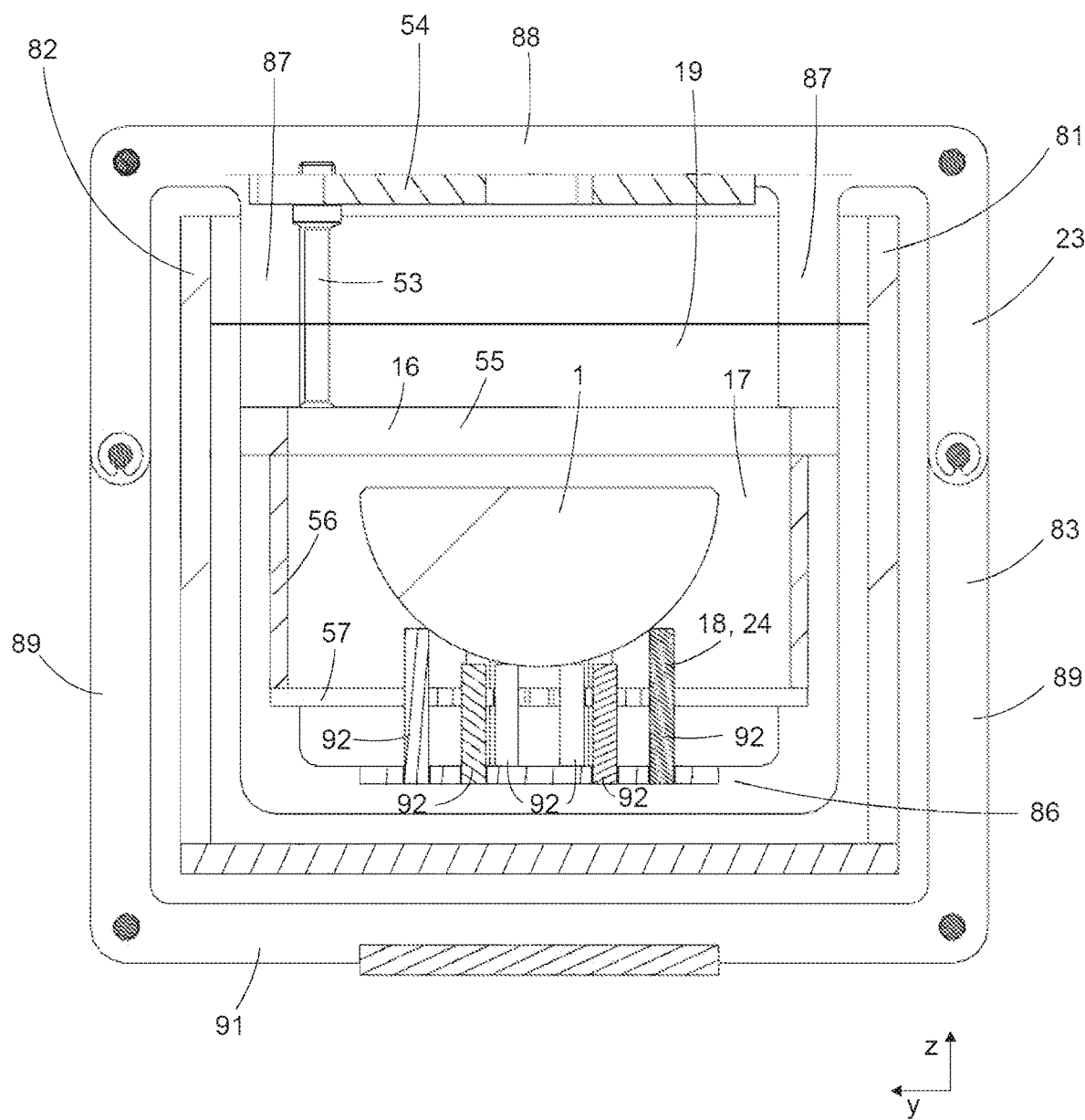

The force transmission structure 23 can be seen in particular in FIG. 11. The force transmission structure 23, in particular the first closed contour 83, comprises exemplarily a structure bottom 86, which is located in particular in the basin 21 in the liquid 19. From the structure bottom 86, a first test piece lifting structure 24 extends upwardly, also located in the liquid 19 in the basin 21, in an exemplary embodiment. Further, inner vertical sections 87 extend vertically upwardly from the structure bottom 86, namely at least one inner vertical section 87 along the inside of the first basin peripheral wall 81 and at least one inner vertical section 87 along the inside of the second basin peripheral wall 82. Exemplarily, each two inner vertical sections 87 are interconnected by an upper horizontal section 88, which expediently runs above the basin 21. The inner vertical sections 87 extend out of the basin 21 and merge into outer vertical sections 89, which extend vertically downward outside the basin 21. At least one outer vertical section 89 extends downwardly along the outside of the first basin peripheral wall 81, and at least one outer vertical section 89 extends downwardly along the outside of the second basin peripheral wall 82. Each two outer vertical sections 89 are connected by a lower horizontal section 91 which runs below the basin 21, in particular below the basin support plate 79. The lower horizontal section 91 is suitably coupled, in particular connected, to the force receiving section of the first weighin unit 22.

The force transmission structure 23 expediently weighs less than 120 g. Expediently, the force transmission structure 23 does not contact the basin 21. The force transmission structure 23 is partially located in the liquid 19, e.g. with the structure bottom 86 and the first test piece lifting structure 24.

In an exemplary embodiment, the first test piece lifting structure 24 is a pin bed. The first test piece lifting structure 24 suitably includes a plurality of first pins 92, suitably extending vertically upward from the structure bottom 86.

The automatic measuring machine 10 is suitably configured to perform weighing of each solid-state test piece 1 using the wet weighing device 4 in a state in which the solid-state test piece 1 is within the receiving area 17 of the respective test piece carrier 16. The first test piece lifting structure 24 serves to penetrate into the respective test piece carrier 16 when weighing a solid-state test piece 1, and to lift the solid-state test piece 1 relative to the test piece carrier 16.

FIG. 11 shows a state in which the test piece carrier 16 with a solid-state test piece 1 has been lowered by the feeding unit 6 into the liquid 19 in the basin 21. Exemplarily, the test piece carrier 16 and the solid-state test piece 1 are completely immersed in the liquid 19. Preferably, the automatic measuring machine 10 is adapted to perform weighing with the wet weighing device 4 in this state to obtain the wet weighing measurement value. The first test piece lifting structure 24, in particular the pins 92, penetrate through the carrier bottom apertures 58 into the receiving area 17 and support the solid-state test piece 1 so that the solid-state test piece 1 is lifted relative to the test piece carrier 16, in particular the carrier bottom 57, and in particular is no longer supported by the test piece carrier 16.

Conveniently, when the test piece carrier 16 is lowered into the basin 21, the pins 92 penetrate through the support bottom apertures 58 into the receiving area 17 so that the solid-state test piece rests on the pins 92 and is not lowered further (with the test piece carrier 16).

According to a preferred embodiment, the automatic measuring machine 10 comprises a liquid level closed-loop control device 25 for closed-loop controlling the liquid level of the basin 21. The liquid level closed-loop control device 25 suitably comprises the liquid container 46. Preferably, the liquid level closed-loop control device 25 further comprises a liquid supply device, a liquid level sensor device and/or a basin drain. Preferably, the liquid supply device comprises a pump, in particular a micro annular gear pump, for supplying the liquid 19 to the basin 21, in particular from the liquid container 46. The liquid level closed-loop control device 25 is adapted to detect the actual liquid level in the basin 21 by means of the liquid level sensor device and to perform a closed-loop control of the liquid level based on the actual liquid level and a target liquid level, in particular using the liquid supply device, in particular the micro annular gear pump. Expediently, the liquid level closed-loop control device 25 is configured to perform the closed-loop control of the liquid level without bubbles, in particular by means of the micro annular gear pump.

Expediently, for weighing the solid-state test piece 1 with the wet weighing device 4, the automatic measuring machine 10 is designed to immerse the solid-state test piece 1 together with a/the respective test piece carrier 16 in the liquid 19 of the basin 21 and, after immersion of the test piece carrier 16, to perform the closed-loop control of the liquid level, in particular by means of the liquid level closed-loop control device 25. In particular, the automatic measuring machine 10 is designed to perform the closed-loop control of the liquid level before the wet weighing measurement value is recorded.

Expediently, the automatic measuring machine 10 is designed to compensate by this closed-loop control of the liquid level for the fact that the test piece carrier 16 and/or the gripper 47 change the liquid level when immersed in the liquid 19 in the basin 21 and thereby influence the wet weighing measurement value.

Figure 13:
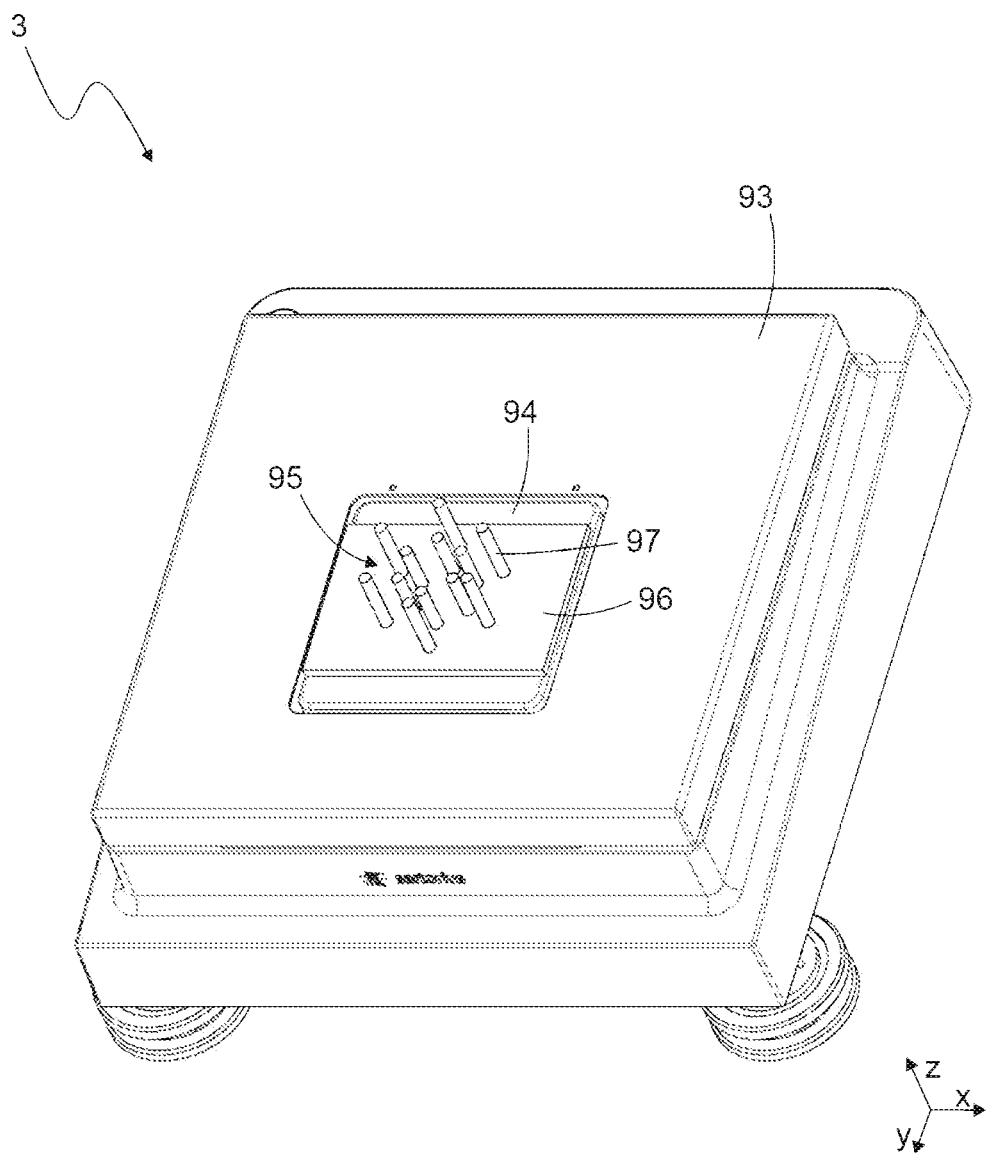

With reference to FIGS. 13 to 15, the dry weighing device 3 will be discussed in more detail below. The dry weighing device 3 comprises a second weighing unit 93, which is exemplarily designed as a laboratory precision scale. The second weighing unit 93 comprises a second force receiving section 94 and is configured to detect the force applied to the second force receiving section 94 and to provide a weighing measurement value, in particular a dry weighing measurement value, based on the detected force. In particular, the second force receiving section 94 is disposed on the upper surface of the second weighing unit 93. On the second force receiving section 94, a second test piece lifting structure 95 is arranged, for example. The second test piece lifting structure 95 is exemplarily designed as a pin bed. The second test piece lifting structure 95 expediently comprises a second structure bottom 96, which is in particular plate-shaped, and a plurality of second pins 97, which expediently extend vertically upward from the second structure bottom 96.

The automatic measuring machine 10 is expediently configured to perform weighing of each solid-state test piece 1 using the dry weighing device 3 in a state in which the solid-state test piece 1 is within the receiving area 17 of the respective test piece carrier 16. The second test piece lifting structure 95 is adapted to penetrate into the respective test piece carrier 16 when weighing a solid-state test piece 1, and to lift the solid-state test piece 1 relative to the test piece carrier 16.

FIG. 15 shows a state in which the test piece carrier 16 with a solid-state test piece 1 has been lowered by the feeding unit 6 onto the second test piece lifting structure 95. Preferably, the automatic measuring machine 10 is adapted to perform weighing with the dry weighing device 3 in this state to obtain the dry weighing measurement value. The second test piece lifting structure 95, in particular the pins 97, penetrate through the carrier bottom apertures 58 into the receiving area 17 and support the solid-state test piece 1 so that the solid-state test piece 1 is lifted relative to the test piece carrier 16, in particular the carrier bottom 57, and in particular is no longer supported by the test piece carrier 16. Expediently, when the test piece carrier 16 is lowered, the pins 92 penetrate through the carrier bottom apertures 58 into the receiving area 17 so that the solid-state test piece 1 rests on the pins 92 and is not lowered further (with the test piece carrier 16).

Figure 16:
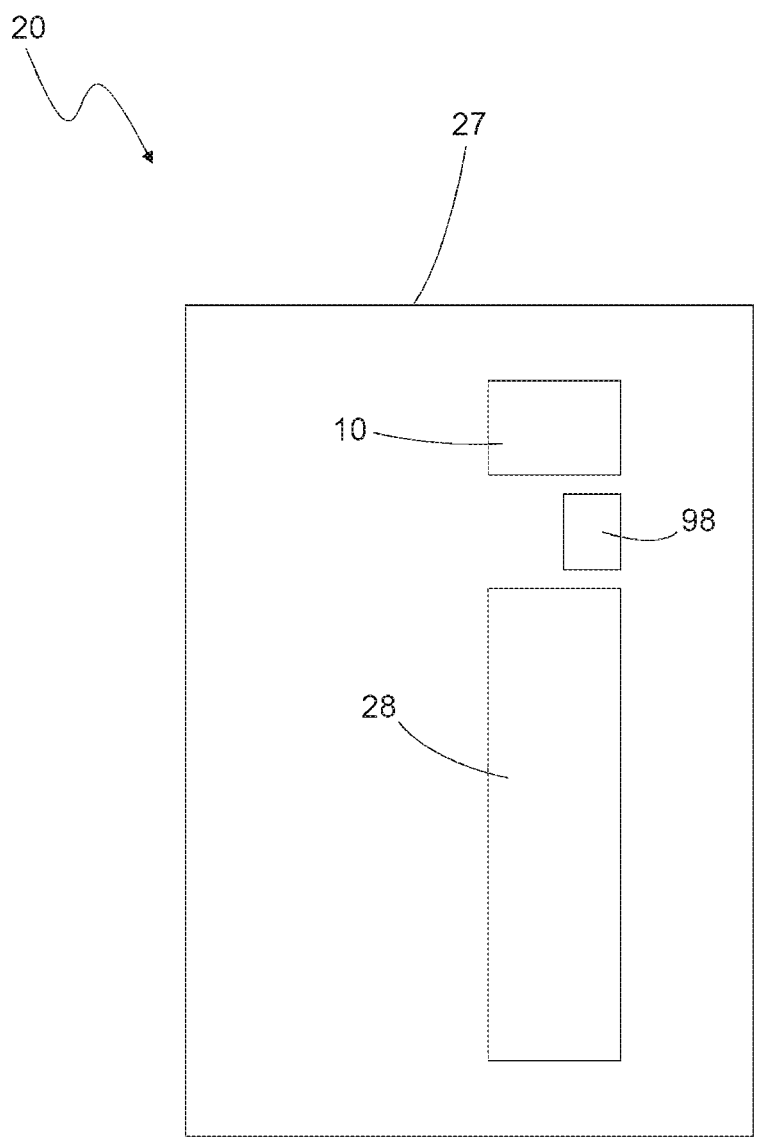

FIG. 16 shows a manufacturing facility 20 comprising a manufacturing hall 27, for example a building hall. The manufacturing facility 20 is in particular an industrial manufacturing facility. The manufacturing facility 20 comprises an automatic measuring machine 10, expediently designed as described herein. The manufacturing facility 20 further comprises a manufacturing device 28 for manufacturing solid-state test pieces 1, for example workpieces. The manufacturing device 28 is configured, for example, to manufacture the solid-state test pieces 1 by additive manufacturing. For example, the manufacturing device 28 comprises a 3D printer for manufacturing the solid-state test pieces 1.

The manufacturing device 28 and the automatic measuring machine 10 are expediently located on the same floor, in particular the floor of the manufacturing hall 27.

Preferably, the manufacturing facility 20 further comprises a loading unit 98 for loading the solid-state test pieces 1 manufactured by the manufacturing device 28 into the automatic measuring machine 10. The loading unit is, for example, a robot unit.

The automatic measuring machine 10 is expediently designed to record weighing measurement values, in particular a wet weighing measurement value and a dry weighing measurement value, for each solid-state test piece 1. The automatic measuring machine 10 is expediently further designed to judge a manufacturing quality of the solid-state test pieces 1 on the basis of the weighing measurement values and to provide corresponding judgement information.

According to one possible embodiment, the manufacturing device 28 is adapted to adjust the manufacturing of the solid-state test pieces based on the judgment information. For example, there is a communication link between the automatic measuring machine 10 and the manufacturing device 28, via which the judgment information is transmitted.

Figure 17:
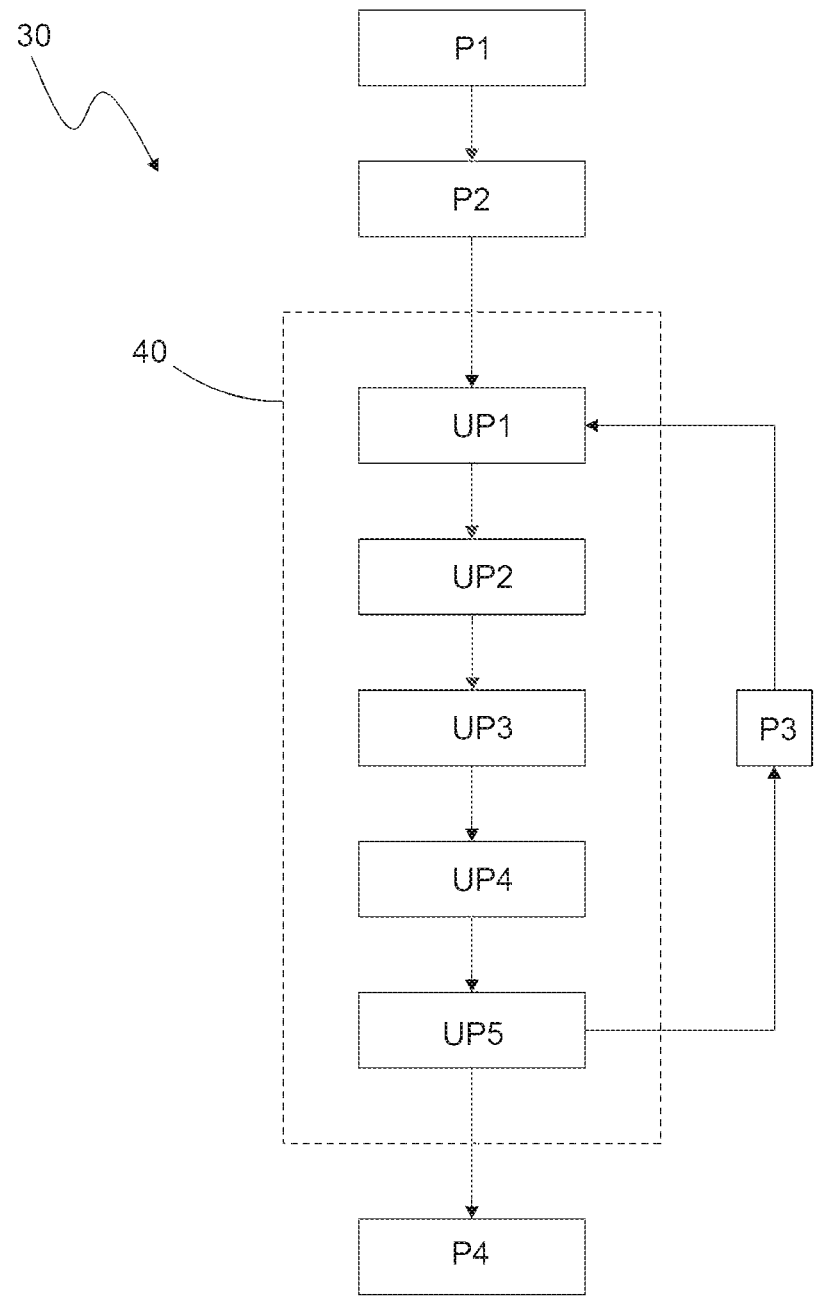

With reference to FIG. 17, an operation of the automatic measuring machine 10 will be discussed below. FIG. 17 shows a flow chart of a method 30 according to which the automatic measuring machine may be operated. The method 30 may also be referred to as a measurement procedure.

Expediently, the automatic measuring machine 10 comprises a control unit, in particular a computer unit, for example a microcontroller, which controls the operation and in particular the steps explained below. In particular, the control unit is designed to control the automated operation of the automatic measuring machine 10. Expediently, the control unit is configured to control the feeding unit 6 to cause the feeding of the solid-state test pieces 1. Further, the control unit is suitably configured to control the liquid level closed-loop control device 25 to effect closed-loop control of the liquid level. Further, the control unit is adapted to communicate with the dry weighing device 3 and the wet weighing device 4 to expediently read out the dry weighing measurement value and the wet weighing measurement value. Expediently, the control unit is further adapted to calculate the density value based on the dry weighing measurement value and the wet weighing measurement value.

The method begins with step P1, in which a plurality of solid-state test pieces 1 are loaded into the automatic measuring machine 10, in particular into the test piece magazine 5. For example, the receiving section 62 is manually pulled out of the working chamber 8 through the loading opening 44 by means of the handle 65 and the solid-state test pieces 1 are loaded into the test piece places, in particular the test piece carriers 16.

According to one possible embodiment, loading is automated. Furthermore, it is possible that loading is carried out by conveying a receiving section 62, which is already loaded with solid-state test pieces 1, into the automatic measuring machine 10, in particular in an automated manner.

The method proceeds to optional step P2, in which selection information indicating one or more test piece places of the test piece magazine 5 is provided to the automatic measuring machine 10. The automatic measuring machine 10 is adapted to perform the determination of the density for those solid-state test pieces 1 which are located at the test piece places determined by the selection information.

For example, the selection information is entered by means of a user input, in particular via the interface 26. For example, the interface 26 displays a representation of the test piece places (for example, a checkerboard pattern) and the user can select those test piece places for which a density determination is to be made by touching the displayed test piece places.

According to one possible embodiment, the automatic measuring machine 10 is designed to automatically detect at which test piece places a solid-state test piece is arranged, for example by means of an optical sensor system.

Step P2 can also expediently take place before step P1 or in parallel with step P1.

The method 30 continues with a measurement sub-procedure 40. Expediently, the automatic measuring machine 10 is configured to perform a separate measurement sub-procedure 40 for each solid-state test piece (for which a density determination is to be made).

The measurement sub-procedure 40 comprises the step UP1, in which the feeding unit 6 picks up a first test piece carrier 16. Expediently, the automatic measuring machine 10 is configured to automatically pick up the first test piece carrier 16 by means of the feeding unit 6, for example by automatically moving the gripper 47 to the first test piece carrier 16, bringing it into engagement with the first test piece carrier 16, for example by performing the gripping movement, and then lifting the test piece carrier 16 out of the test piece magazine 5, in particular out of the receiving section 62.

The measurement sub-procedure 40 further comprises the step UP2 of weighing the first solid-state test piece 1 located in the first test piece carrier 16 by the dry weighing device 3. Expediently, the automatic measuring machine 10 is adapted to move the first solid-state test piece 1 in the first test piece carrier 16 by means of the feeding unit 6 to the dry weighing device 3, expediently by moving the gripper 47 in an x-direction and/or a y-direction. Expediently, the automatic measuring machine 10 is further configured to lower the first test piece carrier 16 onto the dry weighing device 3 by means of the feeding unit 6. Expediently, when the test piece carrier 16 is lowered, the second test piece lifting structure 95 penetrates into the receiving area 17 of the first test piece carrier 16 and lifts the first solid-state test piece 1 relative to the first test piece carrier 16. The as force exerted by the first solid-state test piece 1 on the second test piece lifting structure 95 is transmitted to the second force receiving section 94 and detected by the second weighing unit 93 as a dry weight measurement value.

The measurement sub-procedure 40 further comprises the step UP3 of weighing the first solid-state test piece 1 located in the first test piece carrier 16 by the wet weighing device 4. Expediently, the automatic measuring machine 10 is configured to move the first solid-state test piece 1 in the first test piece carrier 16 by means of the feeding unit 6 to the wet weighing device 4, expediently by moving the gripper 47 in an x-direction and/or a y-direction. Expediently, the automatic measuring machine 10 is further configured to lower the first test piece carrier 16 into the basin 21, in particular the liquid 19, by means of the feeding unit 6. Expediently, when the first test piece carrier 16 is lowered, the first test piece lifting structure 24 penetrates into the receiving area of the first test piece carrier 16 and lifts the first solid-state test piece 1 relative to the first test piece carrier 16. The force exerted by the first solid-state test piece 1 on the first test piece lifting structure 24 is transmitted to the first force receiving section via the force transmitting structure 23, and is detected by the first weighing unit 22 as a wet weighing measurement value.

Expediently, the automatic measuring machine 10 is configured to perform a closed-loop control of the liquid level of the basin 21 after the first test piece carrier 16 has been immersed in the liquid 19. Expediently, the closed-loop control of the liquid level is performed prior to the detection of the wet weighing measurement value. In particular, the closed-loop control of the liquid level is performed before the first solid-state test piece 1 is lowered onto the first test piece lifting structure 24. Expediently, the automatic measuring machine 10 is adapted to zero the first weighing unit 22 after closed-loop controlling the liquid level and before lowering the first solid-state test piece 1 onto the first test piece lifting structure 24.

The measurement sub-procedure 40 further comprises the step UP4 of calculating the density value of the first solid-state test piece 1 based on the dry weighing measurement value and the wet weighing measurement value. In particular, the automatic measuring machine 10 is configured to calculate the density value according to the Archimedean principle. The automatic measuring machine 10 expediently provides the calculated density value as density information.

The measurement sub-procedure 40 further comprises the step UP5, wherein the feeding unit 6 deposits the first test piece carrier 16 back into the test piece magazine 5. Expediently, the automatic measuring machine 10 is configured to automatically deposit the first test piece carrier 16 back into the test piece magazine 5 by means of the feeding unit 6, for example by automatically moving the gripper 47 to the test piece magazine 5, lowering the first test piece carrier 16 into the receiving section 62 and releasing the engagement with the first test piece carrier 16, in particular by a rotational movement of the gripper 47.

Step UP5 can suitably also take place before step UP4 or in parallel with step UP4.

Expediently, the automatic measuring machine 10 is configured to carry out the steps of the measurement sub-procedure 40 fully automatically, i.e. without user intervention. Expediently, the automatic measuring machine 10 is configured to carry out the measurement sub-procedure for a solid-state test piece 1 in two minutes or less.

The method 30 now proceeds to step P3, in which the automatic measuring machine 10 selects the next (second) solid-state test piece 1 to be measured. The method then performs another measurement sub-procedure 40, for a second test piece carrier 16 in which the (second) solid-state test piece 1 to be measured next is located.

The automatic measuring machine 10 is expediently configured to carry out the measurement sub-procedure 40 for further solid-state test pieces 1 to be measured until the density has been determined for all solid-state test pieces 1 stored in the test piece magazine 5 and/or for all solid-state test pieces 1 indicated by the selection information.

The method 30 then proceeds to step P4, at which the method 30 is terminated. For example, in step P4, the solid-state test pieces 1 are removed from the automatic measuring machine 10 and/or sorted according to the density values obtained, in particular automatically.

The invention claimed is:

1. An automatic measuring machine for automated determination of a respective density of a plurality of solid-state test pieces, comprising:
a measuring arrangement comprising a dry weighing device and a wet weighing device,
a test piece magazine for holding the plurality of solid-state test pieces, and
a feeding unit for feeding the solid-state test pieces from the test piece magazine to the measuring arrangement, wherein
the automatic measuring machine is configured to sequentially feed the solid-state test pieces to the measuring arrangement by means of the feeding unit, to weigh the solid-state test pieces using the dry weighing device and the wet weighing device in order to obtain respective weighing measurement values for each solid-state test piece and to determine a respective density value for each solid-state test piece on the basis of the respective weighing measurement values;
wherein the test piece magazine comprises a plurality of test piece carriers, wherein each test piece carrier is configured to hold a respective test piece, and wherein the feeding unit is configured to sequentially take the test piece carriers out of the test piece magazine in order to feed the test pieces in the respective test piece carrier to the measuring arrangement.

2. The automatic measuring machine according to claim 1, wherein the automatic measuring machine is configured to perform weighing of each test piece using the dry weighing device and the wet weighing device in a state in which the test piece is within a receiving area of the respective test piece carrier.

3. The automatic measuring machine according to claim 1, wherein the dry weighing device and/or the wet weighing device each comprise a test piece lifting structure which, for weighing a solid-state test piece, penetrates into the respective test piece carrier and causes the solid-state test piece to be lifted relative to the test piece carrier.

4. The automatic measuring machine according to claim 1, wherein the automatic measuring machine comprises a measuring machine housing surrounding a working chamber in which the measuring arrangement and the test piece magazine are arranged.

5. The automatic measuring machine according to claim 1, further comprising a vibration damping suspension which supports the wet weighing device and the vibration damping suspension is configured to damp mechanical vibrations originating from an environment of the automatic measuring machine in order to reduce vibration influence on the weighing measurement values.

6. The automatic measuring machine according to claim 5, wherein the automatic measuring machine comprises a frame structure with which the test piece magazine and the feeding unit are supported relative to a floor on which the automatic measuring machine stands, and wherein the wet weighing device is vibration-decoupled from the frame structure.

7. The automatic measuring machine according to claim 5, further comprising a working chamber floor on which the test piece magazine stands, wherein the working chamber floor comprises a wet weighing opening through which extends a wet weighing assembly comprising the vibration damping suspension and the wet weighing device.

8. The automatic measuring machine according to claim 1, wherein the wet weighing device comprises a basin filled with a liquid, a first weighing unit arranged outside the basin and a force transmission structure leading from the first weighing unit into the basin, wherein the force transmission structure is adapted, when weighing a solid-state test piece with the wet weighing device, to transmit a force, which is exerted by the solid-state test piece in the liquid on the force transmission structure, from the basin to the first weighing unit.

9. The automatic measuring machine according to claim 1, wherein the wet weighing device comprises a basin as well as a first test piece lifting structure arranged in the basin; wherein first test piece lifting structure, when weighing a solid-state test piece, is configured to penetrate into a respective test piece carrier and causes the solid-state test piece to be lifted relative to the test piece carrier.

10. The automatic measuring machine according to claim 1, wherein the wet weighing device comprises a basin and a liquid level closed loop control device for closed loop controlling a liquid level of the basin.

11. The automatic measuring machine according to claim 10, wherein the automatic measuring machine is configured, for weighing the solid-state test piece with the wet weighing device, to immerse the solid-state test piece together with the respective test piece carrier in a liquid of the basin and to carry out the closed-loop control of the liquid level after immersion of the test piece carrier.

12. The automatic measuring machine according to claim 1, wherein the wet weighing device comprises a basin and a surfactant is admixed to a liquid with which the basin is filled.

13. The automatic measuring machine according to claim 1, wherein the automatic measuring machine is configured to perform, based on selection information indicating one or more test piece places of the test piece magazine, determination of density for said solid-state test pieces which are located at test piece places indicated by the selection information.

14. The automatic measuring machine according to claim 13, wherein the automatic measuring machine comprises an interface for inputting the selection information.

15. The automatic measuring machine according to claim 1, wherein the plurality of solid-state test pieces manufactured by means of additive manufacturing are arranged in the test piece magazine.

16. The automatic measuring machine according to claim 1, wherein the automatic measuring machine is configured to judge, on the basis of the determined density values, a manufacturing quality of the respective solid-state test piece and to provide judgment information.

17. A manufacturing facility comprising a manufacturing hall, a manufacturing device for manufacturing solid-state test pieces, the manufacturing device being arranged in the manufacturing hall, and an automatic measuring machine according to claim 1 arranged in the manufacturing hall.

18. A method for automated determination of a respective density of a plurality of solid-state test pieces, comprising the steps:
feeding, by means of a feeding unit, the solid-state test pieces from a test piece magazine to a measuring arrangement comprising a dry weighing device and a wet weighing device,
weighing the solid-state test pieces using the dry weighing device and the wet weighing device to obtain respective weighing measurement values for each solid-state test piece, and
determining for each solid-state test piece a respective density value based on the respective weighing measurement values, wherein
the test piece magazine comprises a plurality of test piece carriers, which each serve to hold a respective test piece, and wherein the feeding unit sequentially takes the test piece carriers out of the test piece magazine in order to feed the test pieces in the respective test piece carrier to the measuring arrangement.

19. The method of claim 18, wherein the solid-state test pieces are manufactured by additive manufacturing, further comprising the steps of: judging the manufacturing quality of the solid-state test pieces on the basis of the weighing measurement values, and providing judgment information on the manufacturing quality of the solid-state test pieces.

20. The method according to claim 19, wherein the solid-state test pieces are manufactured by 3D printing.

* * * * *